US006725253B1

(12) United States Patent
Okano et al.

(10) Patent No.: US 6,725,253 B1
(45) Date of Patent: Apr. 20, 2004

(54) LOAD BALANCING SYSTEM

(75) Inventors: Tetsuya Okano, Kawasaki (JP);
Akiyoshi Ochi, Kahoku (JP);
Tomotsugu Mochizuki, Shizuoka (JP);
Koichi Takaba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 850 days.

(21) Appl. No.: 09/628,353

(22) Filed: Jul. 28, 2000

(30) Foreign Application Priority Data

Oct. 14, 1999 (JP) .......................................... 11-292906

(51) Int. Cl.$^7$ ............................................. G06F 15/16
(52) U.S. Cl. ....................... 709/203; 709/217; 709/219; 709/224; 709/229; 709/235; 709/238; 718/105; 370/237
(58) Field of Search ................................ 709/200–203, 709/217–219, 223–224, 227–229, 235, 238–239, 242; 718/100, 104, 105; 370/229–230, 235–238

(56) References Cited

U.S. PATENT DOCUMENTS 5,548,724 A * 8/1996 Akizawa et al. ............. 709/203
5,603,029 A * 2/1997 Aman et al. ................. 718/105
5,774,660 A * 6/1998 Brendel et al. .............. 709/201
6,078,960 A * 6/2000 Ballard ........................ 709/229
6,108,684 A * 8/2000 DeKoning et al. ........... 718/105
6,185,601 B1 * 2/2001 Wolff .......................... 718/105
6,393,485 B1 * 5/2002 Chao et al. .................. 709/231
6,671,259 B1 * 12/2003 He et al. ...................... 718/105

* cited by examiner

*Primary Examiner*—Bharat Barot
(74) *Attorney, Agent, or Firm*—Staas & Halsey LLP

(57) ABSTRACT

The load balancing system comprises a first load balancing apparatus (primary), a first load balancing apparatus (secondary), and a first load balancing apparatus (backup), which carry out load balancing by primary-sorting service requests from clients to service sites; and first and second secondary load balancing apparatuses which carry out load balancing by second-sorting the service request which has been primary-sorted by the first load balancing apparatus (primary), the first load balancing apparatus (secondary) and the first load balancing apparatus (backup), to one of multiple servers provided in the site.

11 Claims, 18 Drawing Sheets

[LD ADDRESS]
[OPERATING STATUS FLAG] : 0 = STOP, 15 = IN OPERATION

[LBC ADDRESS]
[OPERATING STATUS FLAG] : 0 = STOP, 15 = IN OPERATION
[SECONDARY FLAG]

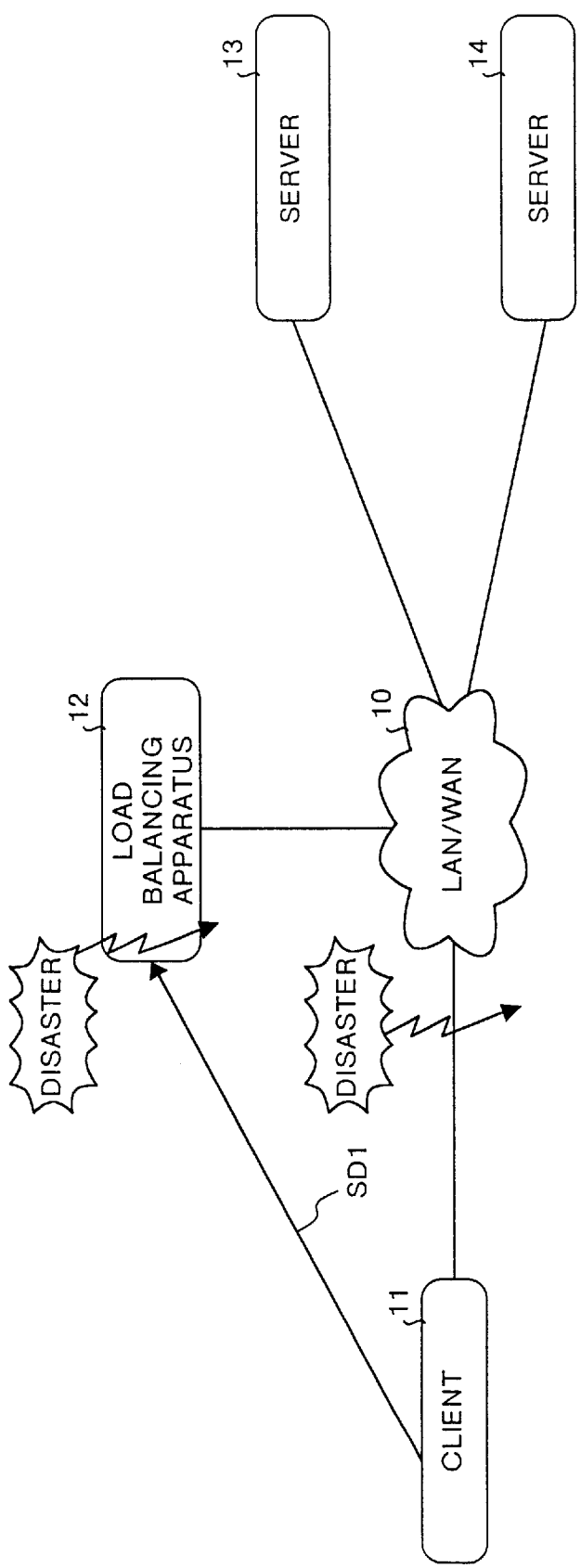

LOAD BALANCING SYSTEM

FIELD OF THE INVENTION

The present invention relates to a load balancing apparatus which balances the load of servers in a client/server system. More particularly, this invention relates to the load balancing system which prevents service from stopping in the event of a disaster.

BACKGROUND OF THE INVENTION

Recently, a load balancing technique f or preventing load concentration in a single server is used in large-scale networks of which the internet is a representative example. According to this technique, multiple servers are provided on a server side which receives a great number of accesses, and the multiple servers function as one server for a client.

This load balancing technique reduces the load on one server by balancing the access from the client among multiple servers. Therefore, in the load balancing technique, accesses are received from the client and are sorted as far as is possible to one of the multiple servers which has a low load and is located near the client. This is important in increasing the efficiency of the network.

FIG. 18 shows one example of a constitution of a conventional network system. In the network system shown in FIG. 18, a round robin method is used as a load balancing method in a DNS (Domain Name System) server. This round robin method handles an access by using domain names explained later, and balances the load by using IP addresses of multiple servers in sequence when converting the domain names to IP (Internet Protocol) addresses.

In FIG. 18, an LAN (Local Area Network)/WAN (Wide Area Network) 1 and an LAN/WAN 4 comprise large-scale networks for carrying out data communication between multiple computers, which are physically separated, by means of internet working. For example, the LAN/WAN 1 and 4 comprise an internet.

A network which satisfies the following conditions is appropriate as the above-mentioned internet.

(1) The computer network has a communications protocol (communications connection sequence) termed a TCP/IP (Transmission Control Protocol/Internet Protocol) mounted therein.

(2) The computer network is connected to one worldwide network configured around several basic networks.

Each protocol TCP and UDP (User Datagram Protocol) in the fourth layer (transport layer) of an OSI (Open System Interconnection) reference model is defined to create the TCP/IP. A characteristic of the TCP is to send reliable data communications (transmissions). That is, regular data communication is ensured by maintaining the reliability of the communications path from the start of the communication to the end of the communication, and by detecting and correcting errors.

The above-mentioned TCP has a connection-type server format for maintaining reliability. In contrast, the UDP is a data transmission protocol termed a connectionless-type for increasing the processing speed, and does not perform response confirmation or sequential adjustments of data received along different communications paths in the network in order to increase reliability.

The client 2 is provided on the client (user) side, and is connected to the LAN/WAN 1. The client 2 comprises a computer end terminal for requesting service from a server 6 (and a server 7) explained later via the LAN/WAN 1 and the LAN/WAN 4. A client-side DNS server 3 realizes internet standard DNS and connects to the LAN/WAN 1.

The DNS will be explained in detail. In the internet, IP addresses are used to identify the end terminals as described above. However, since an IP address comprises a combination of numbers expressed in four octets (32 bits), it is extremely difficult for a person to memorize. Accordingly, domain names (name space) which can be easily memorized by a person are appended to each end terminal as identifiers.

The DNS is a system for managing the relationship between the domain names and the IP addresses, and supplying an IP address in response to an inquiry from the client 2 relating to a domain name. The client-side DNS server 3 is an apparatus for realizing the above-mentioned DNS, and is positioned as a local DNS server for the client 2.

The server 6 is provided on the service supplier side and connects to the LAN/WAN 4. The server 6 comprises a computer terminal for supplying service to the client 2 in accordance with a service request therefrom. The server 7 is similarly provided on the service supplier side as the server 6 and connects to the LAN/WAN 4. The server 7 comprises a computer terminal for supplying service to the client 2 in accordance with a service request therefrom. The server 6 and the server 7 are provided in physically different places. Therefore, the distances between the servers 6 and 7 and the client 2 (the client-side DNS server 3) are different.

From the point of view of the client 2, the servers 6 and 7 function as a single server. A single domain name (hereinafter termed representative domain name) is appended representatively to the servers 6 and 7. In addition, IP addresses are appended to the servers 6 and 7. That is, multiple IP addresses are registered to one domain name in this case, so that the client 2 can access either one of the servers 6 and 7 by accessing one domain name.

That is, the servers 6 and 7 form one virtual server which is expressed by the representative domain name, and the client 2 accesses the representative domain name of this virtual server. One representative domain name is appended to the servers 6 and 7, and the client 2 can access either one of the servers 6 and 7, in order to balance the load as described above. This load balancing will be explained later.

A server-side DNS server 5 functions as a DNS server in the same way as the client-side DNS server 3, and is provided as a higher-level apparatus of the client-side DNS server 3. That is, the server-side DNS server 5 responds to inquiries relating to IP addresses from the client-side DNS server 3.

The server-side DNS server 5 is responsible for the servers 6 and 7, and when an inquiry to convert a representative domain name to an IP address is received from the client-side DNS server 3, the server-side DNS server 5 responds to the client-side DNS server 3 by converting the representative domain name to the IP address of either one of the servers 6 and 7. That is, the server-side DNS server 5 sorts the access request from the client 2 by allocating it to either one of the servers 6 and 7. This sorting constitutes the load balancing mentioned above.

In the above-described constitution, when accessing the virtual server of the representative domain name, for example in a step SA1 the client 2 sends notification via the LAN/WAN 1 to the client-side DNS server 3 of the representative domain name corresponding to the IP address for which an inquiry has been received from the client-side DNS server 3.

The client-side DNS server 3 determines whether the same inquiry has previously been received by accessing its own cash memory (not shown in FIG. 18) and consulting inquiry history data. When the same inquiry has previously been received, in a step SA4 the client-side DNS server 3 notifies the client 2 via the LAN/WAN 1 of the IP address contained in the inquiry history data. The inquiry history data is held in the cash memory for approximately one day.

On the other hand, when the same inquiry has not previously been received, in a step SA2 the client-side DNS server 3 sends an inquiry for DNS to the server-side DNS server 5 via the LAN/WAN 1 and the LAN/WAN 4. Specifically, the client-side DNS server 3 notifies the server-side DNS server 5 of the representative domain name. Consequently, in a step SA3 the server-side DNS server 5 consults a sorting table (not shown in the diagram) in which the server 6 is deemed a first server and the server 7 is deemed a second server, and converts the representative domain name for which notification has been received to, for example, the IP address of the first server 6.

The server-side DNS server 5 transmits the IP address of the server 6 to the client-side DNS server 3 via the LAN/WAN 4 and the LAN/WAN 1. Then, in the step SA4 the client-side DNS server 3 stores the IP address of the server 6 as the above-mentioned inquiry history data in its cash memory (not shown in FIG. 18) and notifies the client 2 via the LAN/WAN 1.

In a step SA5, the client 2 transmits an IP packet including the IP address of the server 6 via the LAN/WAN 1 and the LAN/WAN 4 to the server 6. The IP packet reaches the server 6 after being routed by a router (not shown in FIG. 18). As a result, a connection is established between the client 2 and the server 6, and the server 6 supplies the service requested by the client 2.

When another client which is not shown in FIG. 18 notifies the client-side DNS server 3 of the representative domain name via the LAN/WAN 1 (Step SA1), in the step SA2 the client-side DNS server 3 sends an inquiry for the IP address via the LAN/WAN 1 and the LAN/WAN 4 to the server-side DNS server 5 by the same operation as that described above. In this example, the same inquiry has not been made previously.

Consequently, in the step SA3 the server-side DNS server 5 consults the sorting table (not shown in FIG. 18) and converts the representative domain name for which notification has been received to the IP address of the next server which is the second server 7. The server-side DNS server 5 sends notification of the IP address of the server 7 via the LAN/WAN 4 and the LAN/WAN 1 to the client-side DNS server 3. In the subsequent step SA4, the client-side DNS server 3 notifies the client (not shown in FIG. 18) of the IP address of the server 7 via the LAN/WAN 1.

In the step SA5, the client (not shown in FIG. 18) which has received the above notification transmits an IP packet including the IP address of the server 7 via the LAN/WAN 1 and the LAN/WAN 4 to the server 7. The IP packet reaches the server 7 after being routed by a router which is not shown in FIG. 18. As a result, a connection is established between the client (not shown) and the server 7, and the server 7 supplies the service requested by the client (not shown).

Thereafter, the server-side DNS server 5 balances the load by consulting the sorting table each time an inquiry for an IP address is received and sorting the accesses from the clients as follows: server 6→server 7→server 6→server 7.

Subsequently, the operation will be explained in a case where the system of the server 6 becomes inoperative and the connection to the server 7 is cut-off following a disaster as shown in FIG. 19. FIG. 19 shows the state when a disaster has made the server 6 inoperative and cut-off the connection to the server 7, with the result that the servers 6 and 7 cannot be accessed from the outside. In this example, the servers 6 and 7 are not deleted from the sorting table in the server-side DNS server 5.

In a step SB1, the client 2 notifies the client-side DNS server 3 via the LAN/WAN 1 of the representative domain name corresponding to the IP address for which the client-side DNS server 3 has sent the inquiry.

The client-side DNS server 3 determines whether the same inquiry has previously been received by accessing its own cash memory (not shown in FIG. 18) and consulting the inquiry history data. Assuming that the inquiry history data prior to the disaster is still stored in the cash memory, in a step SB4 the client-side DNS server 3 notifies the client 2 via the LAN/WAN 1 of the IP address of for example the server 6 which is contained in the inquiry history data.

In the step SB5, the client 2 attempts to access the server 6 but is unable to do so since the system of the server 6 is inoperative. However, since the inquiry history data prior to the disaster remains unaffected, the client 2 is notified of the IP address of the server 6 even though it cannot actually be accessed.

On the other hand, when the same inquiry has not previously been received, in a step SB2 the client-side DNS server 3 sends a representative domain name to the server-side DNS server 5 via the LAN/WAN 1 and the LAN/WAN 4. Consequently, in a step SB3 the server-side DNS server 5 consults a sorting table (not shown in the diagram) in which the server 6 is deemed a first server and the server 7 is deemed a second server, and converts the representative domain name for which notification has been received to, for example, the IP address of the first server 6. It should be noted that the sorting table has been prepared prior to the disaster and does not reflect the present state of the server 6 (i.e. the fact that the server 6 cannot be accessed).

In the step SB3, the server-side DNS server 5 sends the IP address of the server 6 to the client-side DNS server 3 via the LAN/WAN 4 and the LAN/WAN 1. In the step SB4, the client-side DNS server 3 stores the IP address of the server 6 as the above-mentioned inquiry history data in its cash memory (not shown in FIG. 19) and notifies the client 2 via the LAN/WAN 1. Then, in the step SB5, the client 2 attempts to access the server 6 but is unable to do so since the server 6 is inoperative.

When another client which is not shown in FIG. 19 notifies the client-side DNS server 3 of the representative domain name via the LAN/WAN 1 (Step SB1), in the step SB2 the client-side DNS server 3 sends an inquiry for the IP address of a virtual server via the LAN/WAN 1 and the LAN/WAN 4 to the server-side DNS server 5 by the same operation as that described above. In this example, the same inquiry has not been made previously.

In the step SB3, the server-side DNS server 5 consults the sorting table (not shown in FIG. 19) and converts the received representative domain name to the IP address of the subsequent second server, which is the server 7. It should be noted here that the sorting table was prepared prior to the disaster and consequently does not reflect the present state of the server 7 (i.e. the fact that the server 7 cannot be accessed).

The server-side DNS server 5 sends notification of the IP address of the server 7 via the LAN/WAN 4 and the LAN/WAN 1 to the client-side DNS server 3. In the subsequent step SB4, the client-side DNS server 3 notifies the client (not shown in FIG. 19) of the IP address of the server 7 via the LAN/WAN 1. In the step SB5, the client (not shown in FIG. 19) which has received the above notification attempts to access the server 7, but cannot do so since the connection line to the server 7 has been severed.

FIG. 20 is a diagram showing a second example of a constitution of a conventional network system. In the network system shown in FIG. 20, an NAT (Network Address Translator) method for converting a destination address of an IP header to an IP address of a server at the sorting destination, and an MAC (Media Access Control) method for substituting the destination address with an MAC address of the sorting destination server and the like, are used as the load balancing method.

In FIG. 20, an LAN/WAN 10 is a large-scale network for carrying out data communication between multiple physically separate computers by means of internet working, and for example comprises the internet. The client 11 is provided on a client (user) side and connects to the LAN/WAN 10.

The client 11 comprises a computer end terminal for requesting service from a server 13 (and a server 14) explained later via the LAN/WAN 10. A load balancing apparatus 12 balances the load between the servers 13 and 14 by sorting access requests from the client 11 to either one of the servers 13 and 14 by means of NAT and MAC as described above. A representative IP address represents the servers 13 and 14 and is appended to the load balancing apparatus 12.

The servers 13 and 14 are provided on the service supplier side and connect to the LAN/WAN 10. The servers 13 and 14 comprise computer terminals for supplying service to the client 11 in accordance with service requests therefrom. By using the above-mentioned representative IP address, the servers 13 and 14 function as a single server from the point of view of the client 11. An IP address is appended to each of the servers 13 and 14. That is, the servers 13 and 14 form one virtual server which is expressed by the representative IP address, and the client 11 accesses the representative IP address of this virtual server.

To access the virtual server in the above constitution, for example in a step SC1 the client 11 accesses the load balancing apparatus 12 having the representative IP address via the LAN/WAN 10. In a step SC2, the client 12 sorts an IP packet (service request) from the client 11 and allocates it to the server 14, for example, by means of NAT and MAC.

In a subsequent step SC3, a connection via the LAN/WAN 10 and the load balancing apparatus 12 is established between the client 11 and the server 14, and the server 14 supplies the service requested by the client 11. In certain cases, the connection route between the client 11 and the server 14 does not pass via the load balancing apparatus 12 but only via the LAN/WAN 10 as a step SC4.

Subsequently, the operation will be explained in a case where a disaster has made the load balancing apparatus 12 inoperative and cut-off the connection to the LAN/WAN 10, as shown in FIG. 21. It is assumed that the disaster has not affected the servers 13 and 14.

In such a state, in a step SD1 the client 11 attempts to access the load balancing apparatus 12 having the representative IP address but is unable to do so since the load balancing apparatus 12 is inoperative and the connection line to the LAN/WAN 10 is cut-off, even though the servers 13 and 14 are functioning normally.

As described above, in the conventional network system the load is efficiently balanced by the client-side DNS server 3 and the server-side DNS server 5 shown in FIG. 18, and by the load balancing apparatus 12 shown in FIG. 20.

However, the conventional network system is extremely vulnerable to disaster as described in FIGS. 19 and 21. For example, when one load balancing apparatus 12 has become inoperative due to a disaster, the entire system stops.

Accordingly, each apparatus may be configured complexly to prevent the service from stopping in the event of a disaster. However, when a disaster such as an earthquake occurs in a region in which multiple apparatuses having complex constitutions are provided, there is a high possibility that all the multiple apparatuses will be damaged. For this reason, the above-mentioned method offers no basic solution.

SUMMARY OF THE INVENTION

It is an object of the present invention to obtain a load balancing system which is capable of preventing the service from stopping due to a disaster.

In order to achieve the above objects, a first aspect of this invention provides a load balancing system applied in a network system comprising a plurality of clients (corresponding to the clients 100 and 200 in the embodiment described later), and a plurality of servers (corresponding to the servers 510, 520, 610 and 620 in the embodiment described later) which are separately provided in a plurality of sites (corresponding to the service sites $SS_1$ and $SS_2$ in the embodiment described later) and supply services to the plurality of clients, the load balancing system balancing service requests from the plurality of clients, and comprising a plurality of first load balancing units (corresponding to first load balancing apparatuses 410, 420 and 430 in the embodiment described later) which are provided physically separate and balance load by first-sorting service requests from the plurality of clients to the plurality of sites; and a plurality of second load balancing units (corresponding to a second load balancing apparatus 500 and a second load balancing apparatus 600 in the embodiment described later) which are provided in correspondence with the plurality of sites and each carry out load balancing by second-sorting a service request which has been first-sorted by the first load balancing unit to one of a plurality of servers provided in the site; one of the plurality of first load balancing units being set as a primary, the primary first load balancing unit monitoring the operating status of the other first load balancing units and the plurality of second load balancing units, and removing a unit which has stopped operating from the units which carry out load balancing.

According to the invention of the first aspect, when a client makes a request for service, one of the plurality of first load balancing units first-sorts the service request to one site (a second load balancing unit). Consequently, the second load balancing unit second-sorts the service request to one server.

In the case where one of multiple first load balancing units has stopped operating as a result of a disaster, this first load balancing unit is excluded from the units which balance the load by first-sorting. Therefore, in this case, the excluded first load balancing unit does not carry out first-sorting even when a client sends a service request. Instead, the service request is first-sorted by the other first load balancing unit which is operating normally.

Further, in the case where one of the plurality of second load balancing units has stopped operating due to a disaster, this second load balancing unit is excluded from the units which carry out load balancing by second-sorting. Therefore, in this case, the first-sorted service request is not second-sorted by the excluded second load balancing unit, but is instead second-sorted by the other second load balancing unit which is operating normally.

Thus, according to the first aspect of the invention, the primary first load balancing unit is set, and this first load balancing unit monitors the operating statuses of the other first load balancing unit and the plurality of second load balancing units. When one of the units stops operating, it is excluded from the units which perform load balancing. Therefore, it is possible to prevent the service from stopping due to a disaster.

Further, the invention according to a second aspect comprises the load balancing system as described in the first aspect, wherein one of the first load balancing units other than the primary first load balancing unit is set as a secondary; the operating statuses of the plurality of first load balancing units and the plurality of second load balancing units are mutually monitored, and in the case where the primary first load balancing unit has stopped operating according to the result of the mutual monitoring, the secondary first load balancing unit functions as a primary first load balancing unit.

According to the invention of the second aspect, when the result of mutually monitoring the operating status indicates that the primary first load balancing unit has stopped operating, the secondary first load balancing unit immediately functions as a primary first load balancing unit.

In this way, according to the invention of the second aspect, since the secondary first load balancing unit is set beforehand, when the primary first load balancing unit stops operating, the secondary first load balancing unit can immediately function as a primary first load balancing unit. Therefore, the fatal problem of there being no primary can be avoided.

Further, the invention according to a third aspect comprises the load balancing system as described in the second aspect, wherein in the case where the primary first load balancing unit which stopped operating has recommenced operation according to the result of the mutual monitoring, the primary first load balancing unit at that point functions as a secondary and the first load balancing unit which has recommenced operation functions as a primary.

According to the invention of the third aspect, when the primary first load balancing unit which stopped operating has starting operating again, the primary at that point is automatically switched to the original primary. In this way, according to the invention of the third aspect, the operating status of the first load balancing unit which has stopped operating is mutually monitored, thereby making it possible to immediately switch the primary to the original primary at the point where the first load balancing unit recovered.

Further, the invention according to a fourth aspect comprises the load balancing system as described in any one of the first to third aspects, wherein the plurality of first load balancing units and the plurality of second load balancing units are physically dispersed across a wide region.

According to the invention of the fourth aspect, the plurality of first load balancing units and the plurality of second load balancing units are physically dispersed across a wide region. Therefore, damage can be kept to a minimum even when a disaster (such as an earthquake) occurs locally. As a consequence, service stoppage caused by damage due to the disaster can be more effectively avoided.

Further, the invention according to a fifth aspect comprises the load balancing system as described in any one of the first to fourth aspects, wherein the primary first load balancing unit creates and updates a sorting table for considering and first-sorting the load in the plurality of servers, distributes the sorting table to the other first load balancing units when creating and updating the sorting table, and carries out first-sorting based on the sorting table.

According to the invention of the fifth aspect, the sorting table which is created and updated by the primary first load balancing unit is distributed to the other first load balancing units. Therefore, problems arising from update misses can be prevented, since all the load balancing units carry out first-sorting based on the same reference.

Further, the invention according to a sixth aspect comprises the load balancing system as described in the fifth aspect, wherein the primary first load balancing unit creates and updates the sorting table based on measurements taken by the plurality of second load balancing units of the load in the plurality of servers.

According to the invention of the sixth aspect, first-sorting is carried out based on a sorting table which reflects the results of measurements of the actual load in the server. Therefore, the load can be balanced in accordance with the actual load.

Further, the invention according to a seventh aspect comprises the load balancing system as described in the sixth aspect, wherein the primary first load balancing unit creates and updates the sorting table based on measurements taken by the plurality of second load balancing units of the path load in the communications path to the plurality of clients.

According to the invention of the seventh aspect, first-sorting is carried out based on a sorting table which reflects the path load. Therefore, the load balancing can be carried out as appropriate to the status of the communications path.

Other objects and features of this invention will become understood from the following description with reference to the accompanying drawings.

BRIEF DESCRIPTION OF THE DRAWINGS

FIG. 21 is a diagram showing an operation when a disaster occurs in the second example constitution of the conventional network system.

DESCRIPTION OF THE PREFERRED EMBODIMENTS

A preferred embodiment of the load balancing system according to the present invention will be explained with reference to the accompanying drawings.

Figure 1:
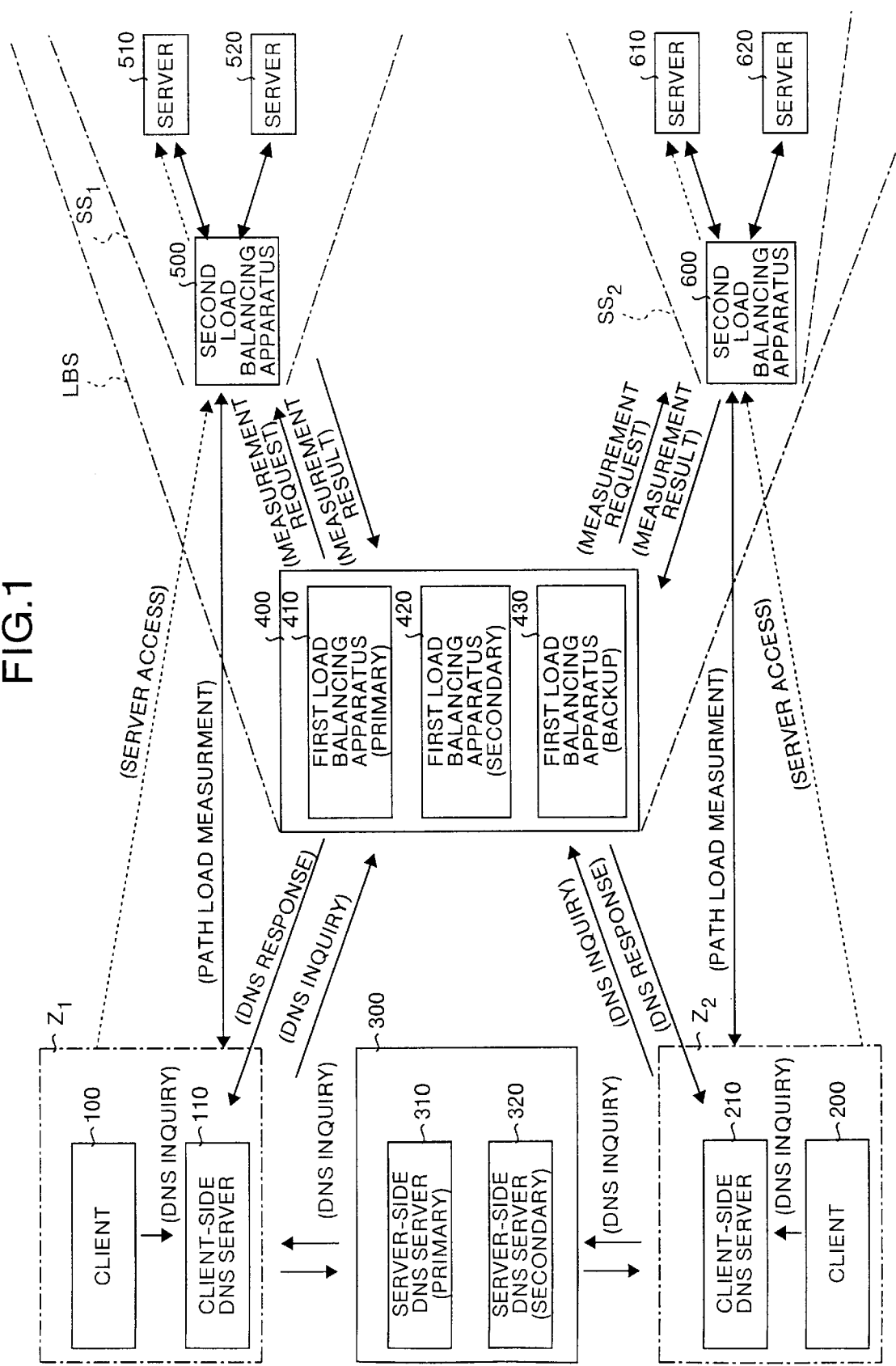
FIG. 1 is a diagram showing a schematic constitution of an embodiment of the load balancing system according to this invention.

FIG. 1 is a block diagram showing a schematic constitution of an embodiment of this invention. In FIG. 1, a client 100, a client-side DNS server 110, a client 200, a client-side DNS server 210, a server-side DNS server group 300, a first load balancing apparatus group 400, a second load balancing apparatus 500, a server 510, a server 520, a second load balancing apparatus 600, a server 610 and a server 620 are connected to a network (e.g. the internet) comprising a router which is not shown in FIG. 1, and can be accessed.

The network system shown in FIG. 1 is broadly divided, and the divided areas are classified as a DNS zone $Z_1$ and a DNS zone $Z_2$ which comprise client-side regions, a service site $SS_1$ and a service site $SS_2$ for supplying services, and a load balancing site LBS for balancing the load.

In the DNS zone $Z_1$, the client 100 is provided on the client (user) side and comprises a computer end terminal which receives services from the server 510, the server 520, the server 610 and the server 620 explained later by sending the IP packet to the router (not shown in FIG. 1) as same as the client 100. Before accessing the servers, the client 100 makes a DNS inquiry by notifying the client-side DNS server 110 of the representative domain name of the server 510, the server 520, the server 610 and the server 620, and obtaining the IP address of the address destination.

The client-side DNS server 110 is a server for realizing the above-mentioned DNS, and is connected to the client 100. When the client-side DNS server 110 has received a DNS inquiry from the client 100, the client-side DNS server 110 makes a DNS inquiry to the server-side DNS server group 300 (first load balancing apparatus group 400) which is provided at a higher level thereto, and receives the IP address (DNS response) of the second load balancing apparatus 500 or the second load balancing apparatus 600 which constitute the address destination of the client 100 as notified by the first load balancing apparatus group 400. The client-side DNS server 110 sends this IP address to the client 100.

In the DNS zone $Z_2$, the client 200 is provided on the client (user) side and comprises a computer end terminal which receives services from the server 510, the server 520, the server 610 and the server 620 explained later by sending the IP packet to the router (not shown in FIG. 1). Before accessing the servers, the client 200 makes a DNS inquiry by notifying the client-side DNS server 210 of the representative domain name of the server 510, the server 520, the server 610 and the server 620, and obtaining the IP address of the second load balancing apparatus 500 or the second load balancing apparatus 600 constituting the address destination.

The client-side DNS server 210 is a server for realizing the above-mentioned DNS, and is connected to the client 200. When the client-side DNS server 210 has received a DNS inquiry from the client 200, the client-side DNS server 210 makes a DNS inquiry to the server-side DNS server group 300 (first load balancing apparatus group 400) which is provided at a higher level thereto, and receives the IP address (DNS response) of the second load balancing apparatus 500 or the second load balancing apparatus 600 which constitute the address destination of the client 200 as notified by the first load balancing apparatus group 400. The client-side DNS server 210 sends this IP address to the client 200.

The server-side DNS server group 300 is a higher-level apparatus of the client-side DNS server 110 and the client-side DNS server 210, and realizes the above-mentioned DNS. The first load balancing apparatus group 400 provides the load balancing function of the server-side DNS server group 300. The server-side DNS server group 300 comprises a server-side DNS server (primary) 310 and a server-side DNS server (secondary) 320, and has a complex constitution.

The first load balancing apparatus group 400 transmits the IP address of either one of the second load balancing apparatus 500 and the second load balancing apparatus 600 in response to a DNS inquiry from the client-side DNS server 110 and the client-side DNS server 210, based on a sorting table and the like described later. That is, the first load balancing apparatus group 400 executes first load balancing by carrying out first-sorting of access requests from the client 100 and the client 200 into those destined for the second load balancing apparatus 500 and those destined for the second load balancing apparatus 600.

The first load balancing apparatus group 400 comprises a first load balancing apparatus (primary) 410, a first load balancing apparatus (secondary) 420 and a first load balancing apparatus (backup) 430, and has a complex constitution. The first load balancing apparatus (primary) 410, the first load balancing apparatus (secondary) 420 and the first load balancing apparatus (backup) 430 have a common function of load balancing.

In addition to balancing the load, the first load balancing apparatus (primary) 410 also controls the first load balancing apparatus (secondary) 420 and the first load balancing apparatus (backup) 430. The first load balancing apparatus (secondary) 420 functions as a substitute for the first load balancing apparatus (primary) 410 when the first load balancing apparatus (primary) 410 has stopped functioning. With the exception of the primary apparatuses, all the apparatuses in the first load balancing apparatus group 400 are provided as backup. Therefore, the first load balancing apparatus (secondary) 420 functions both as a backup apparatus and as a secondary apparatus.

In the service site $SS_1$, the second load balancing apparatus 500 is provided near the server 510 and the server 520. In accordance with the operating status of the server 510 and the server 520, the second load balancing apparatus 500 executes secondary sorting of the IP packets (service requests) which have been primary-sorted by the first load balancing apparatus group 400, allocating them to the server in the better operating status. This sorting is achieved by using the above-described NAT method of converting a destination address of an IP header to an IP address of a server at the sorting destination, or the MAC method of substituting the destination address with an MAC address of the sorting destination server, or such like.

Triggered by a measurement request from the first load balancing apparatus group 400, the second load balancing apparatus 500 measures the load in the communications path to, for example, the client-side DNS server 110 (server 510 and server 520). The server 510 is provided on the service supplier side, and comprises a computer terminal for supplying service to the client 100 in accordance with a service request based on an access by the client 100. Similarly, the server 520 is provided on the service supplier side, and comprises a computer terminal for supplying service to the client 100 in accordance with a service request based on an access by the client 100.

In the service site $SS_2$, the second load balancing apparatus 600 is provided near the server 610 and the server 620. In the same way as the second load balancing apparatus 500, the second load balancing apparatus 600 executes secondary sorting of the IP packets (service requests) which have been primary-sorted by the first load balancing apparatus group 400 in accordance with the operating status of the server 610 and the server 620, and allocates them to the server in the better operating status. This sorting is achieved by using the above-described NAT method of converting a destination address of an IP header to an IP address of a server at the sorting destination, or the MAC method of substituting the destination address with an MAC address of the sorting destination server, or such like.

In the same way as the second load balancing apparatus 500, the second load balancing apparatus 600 is triggered by a measurement request from the first load balancing apparatus group 400 to measure the load in the communications path to, for example, the client-side DNS server 210 (server 610 and server 620). The server 610 is provided on the service supplier side, and comprises a computer terminal for supplying service to the client 200 in accordance with a service request based on an access by the client 200. Similarly, the server 620 is provided on the service supplier side, and comprises a computer terminal for supplying service to the client 200 in accordance with a service request based on an access by the client 200.

From the point of view of the client 100 (the client 200), the server 510, the server 520, the server 610 and the server 620 function as a single virtual server. Therefore, a single representative domain name is appended to the server 510, the server 520, the server 610 and the server 620. However, individual IP addresses are appended to the server 510, the server 520, the server 610 and the server 620. An IP address which deems the server 510 and the server 520 to be a virtual server is appended to the second load balancing apparatus 500 in the service site $SS_1$. Similarly, an IP address which deems the server 610 and the server 620 to be a virtual server is appended to the second load balancing apparatus 600 in the service site $SS_2$.

Figure 2:
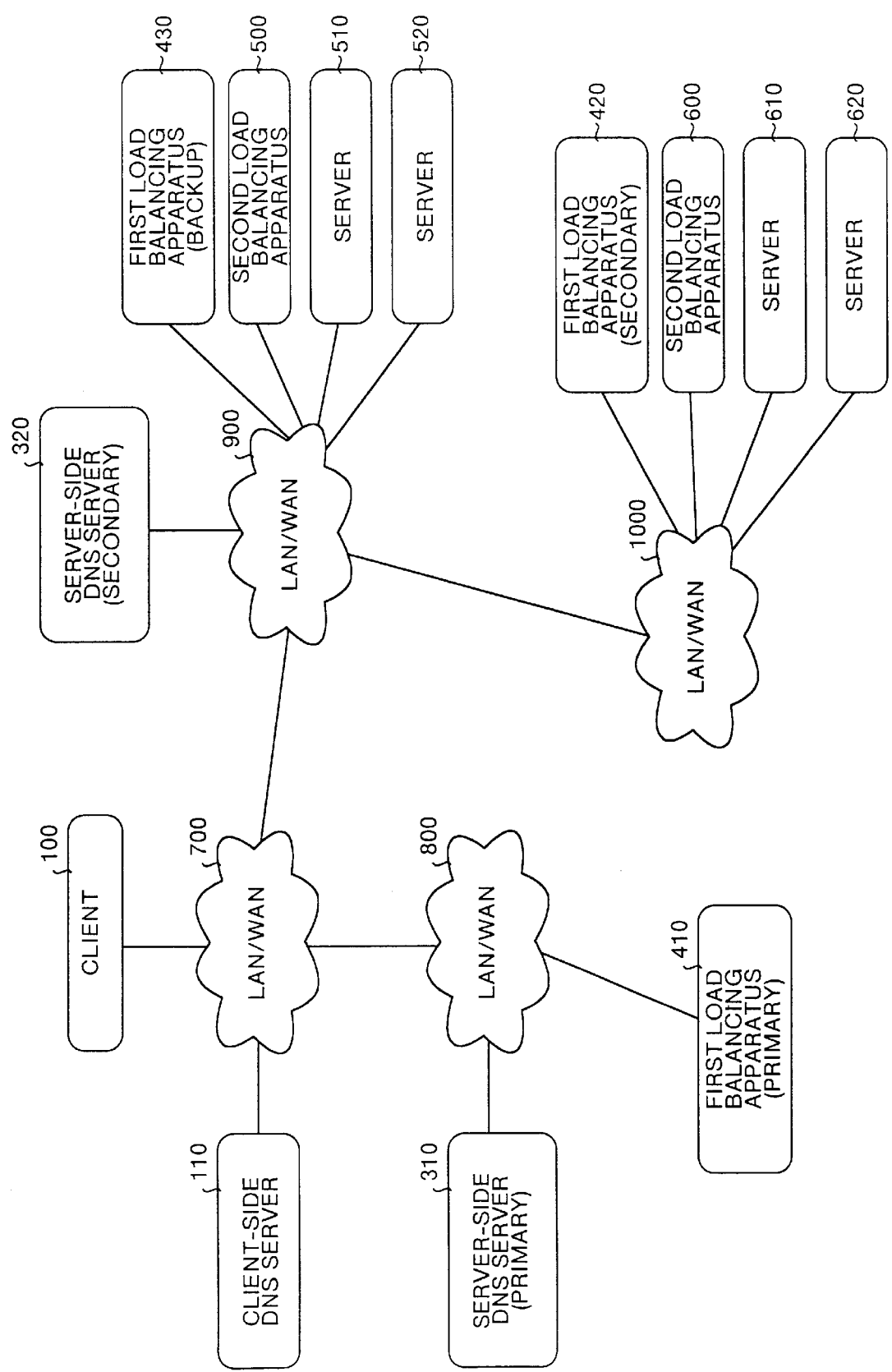
FIG. 2 is a diagram showing a constitution of the same embodiment.

Subsequently, the specific constitution of the embodiment will be explained with reference to FIG. 2. In FIG. 2, the sections which correspond to sections of FIG. 1 are represented by identical reference codes. However, the client 200 and the client-side DNS server 210 shown in FIG. 1 are omitted from FIG. 2 in order to simply the explanation.

FIG. 2 shows a LAN/WAN 700, a LAN/WAN 800, a LAN/WAN 900 and a LAN/WAN 1000 which are mutually connected. The client 100 and the client-side DNS server 110 connect to the LAN/WAN 700. The server-side DNS server (primary) 310 and the first load balancing apparatus (primary) 410 connect to the LAN/WAN 800.

The server-side DNS server (secondary) 320, the first load balancing apparatus (backup) 430, the second load balancing apparatus 500, the server 510 and the server 520 connect to the LAN/WAN 900. The first load balancing apparatus (secondary) 420, the second load balancing apparatus 600, the server 610 and the server 620 connect to the LAN/WAN 1000.

The client 100, . . . , and the server 620 are provided physically separate in this way so as to avoid concentrated damage in the event of a regional disaster. Particularly, the first load balancing apparatus (primary) 410, the first load balancing apparatus (secondary) 420 and the first load balancing apparatus (backup) 430 which comprise the first load balancing apparatus group 400 (see FIG. 1) are the central apparatuses of the system. Therefore, the significance of physically dispersing the first load balancing apparatus (primary) 410 and the like is considerable. Similarly, the significance of physically dispersing the server-side DNS server (primary) 310 and the server-side DNS server (secondary) 320 is considerable.

Figure 3:
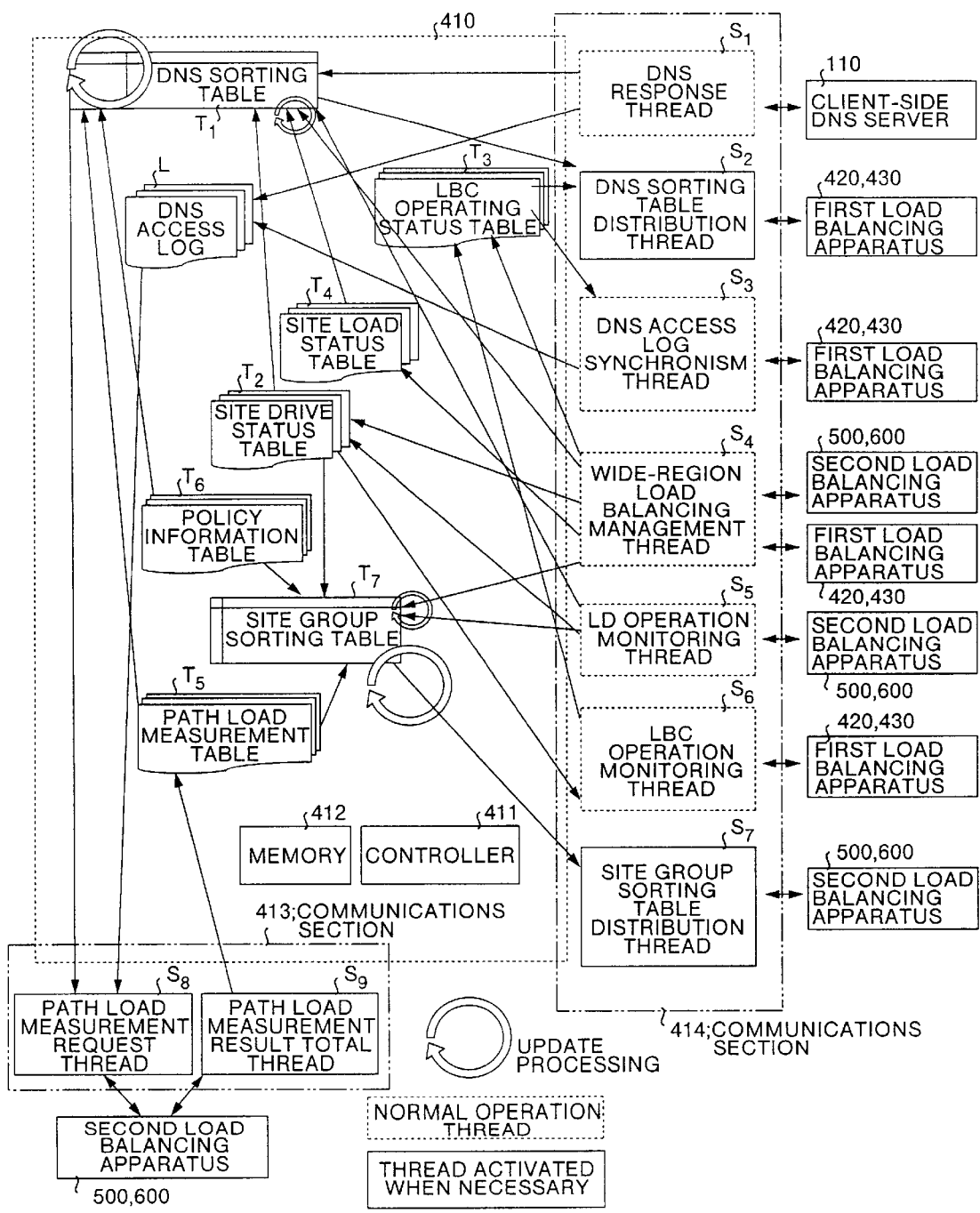
FIG. 3 is a block diagram showing the constitution of the first load balancing apparatus (primary) 410 shown in FIG. 2.

Subsequently, the constitution of the first load balancing apparatus (primary) 410 shown in FIG. 2 will be explained with reference to FIG. 3. In FIG. 3, sections which correspond to those of FIG. 2 are represented by identical reference codes. The first load balancing apparatus (primary) 410 comprises a controller 411 which controls all sections of the apparatus, a memory 412, and communications sections 413 and 414 which send/receive transmissions to/from external apparatuses (the client-side DNS server 110 etc.).

The controller 411 generates a DNS response thread $S_1$, a DNS sorting table distribution thread $S_2$, . . . , and a path load measurement result thread $S_9$, and controls the execution of these threads. The operation of this controller 411 will be explained in greater detail later. The memory 412 stores a DNS sorting table $T_1$, a site operating status table $T_2$, . . . , a site group sorting table $T_7$ and a DNS access log L.

Figure 4:
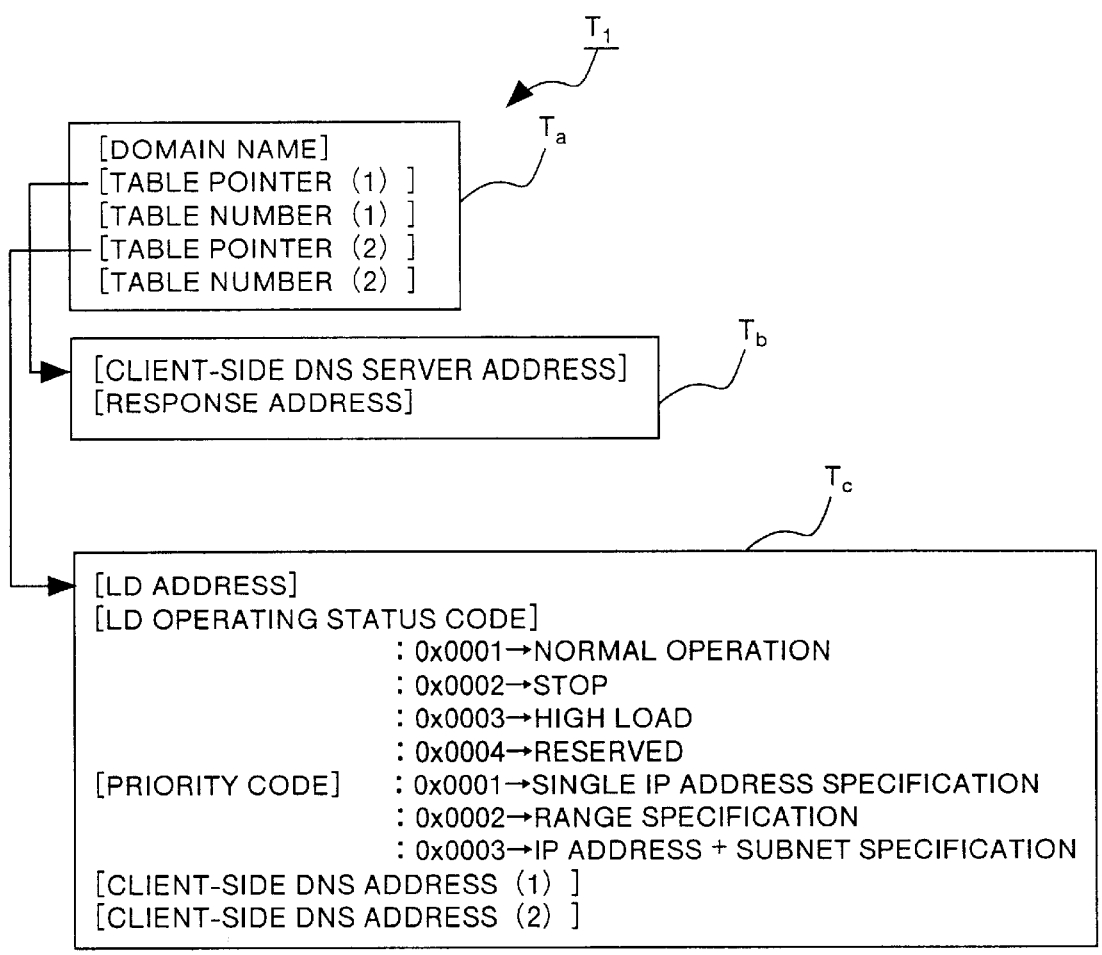
FIG. 4 is a diagram showing one example of the DNS sorting table $T_1$ shown in FIG. 3.

The DNS sorting table $T_1$ is used in the above-mentioned first-sorting in accordance with a DNS inquiry from the client-side DNS server 110. The controller 411 creates the DNS sorting table $T_1$ based on a site load status table $T_4$, a path load measurement table $T_5$, a policy information table $T_6$, and the like. As shown in FIG. 4, the DNS sorting table $T_1$ comprises a main table $T_a$, a sorting destination continuity-preservation table $T_b$ and an LD information table $T_c$.

The main table $T_a$ comprises a "domain name" which represents the representative domain name, a "table pointer (1)" which represents a pointer to the sorting destination continuity-preservation table $T_b$, a "table number (1)" which represents the number of sorting destination continuity preservation tables $T_b$, a "table pointer (2)" which represents a pointer to the LD information table $T_c$, and a "table number (2)" which represents the number of LD information tables $T_c$.

The sorting destination continuity-preservation table $T_b$ holds an IP address of a first-sorting destination to be sent to the client-side DNS server at the source of the DNS inquiry for a fixed period of time. The sorting destination continuity-preservation table $T_b$ comprises a "client-side DNS server address" which represents the IP address of the client-side DNS server at the source of the DNS inquiry, and a "response address" which represents the IP address of the second load balancing apparatus 500 and the second load balancing apparatus 600 corresponding to the DNS inquiry.

The LD information table $T_c$ stores information representing the operating status in the second load balancing apparatus 500 and the second load balancing apparatus 600. An entry "LD address" in the LD information table $T_c$ represents the IP address of the second load balancing apparatus 500 (or the IP address of the second load balancing apparatus 600).

An entry "LD operating status code" represents the operating status code of the second load balancing apparatus 500 (the second load balancing apparatus 600). This operating status code may be 0x0001 (=normal operation) which shows that the apparatus is operating normally, 0x0002 (=stop) which shows that the operation has stopped, 0x0003 (=high load) which shows that the load is high, and 0x0004 (=reserved) which shows that the apparatus has been reserved as a sorting destination.

"Priority code" represents a priority code for identifying the client-side DNS server source of a DNS inquiry which is given priority when sorting, and is based on the path load measurement result in a path load measurement $T_5$ explained later. The priority codes include 0x0001 which shows that a single client-side DNS server has been specified (single IP address specification), 0x0002 which shows that a plurality of client-side DNS servers have been specified within a given range, and 0x0003 which shows that a subnet is specified in addition to the IP address of the client-side DNS server.

When the "Priority Code" stored in the LD information table $T_c$ is 0x0001 (=a single IP address is specified), the IP address of the corresponding client-side DNS server is stored in the "Client-side DNS address (1)". When the "Priority Code" of 0x0002 (=range specification) is stored, the youngest IP address in the multiple client-side DNS servers is stored in the "Client-side DNS address (1)" and the oldest IP address in the multiple client-side DNS servers is stored in the "Client-side DNS address (2)".

When the "Priority Code" of 0x0003 (=IP address+subnet specification) is stored, the IP address of the client-side DNS server is stored in the "Client-side DNS address (1)" and the subnet is stored in the "Client-side DNS address (2)".

Figure 5:
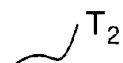
FIG. 5 is a diagram showing one example of the site drive status table $T_2$ shown in FIG. 3.

The site operating status table $T_2$ shown in FIG. 5 shows the operating status ("stop" or "in operation") of the second load balancing apparatus 500 and the second load balancing apparatus 600. The site drive status table $T_2$ comprises "LD Address" which represents the IP address of the second load balancing apparatus 500 (second load balancing apparatus 600) and "Operating status Flag" (0: Stop, 15: In Operation) which represents the operating status of the second load balancing apparatus 500 (second load balancing apparatus 600).

The site drive status table $T_2$ is created at the start-up of the first load balancing apparatus (primary) 410, and is updated based on monitoring (LD operation monitoring thread 55 see FIG. 3) of the second load balancing apparatus 500 (the second load balancing apparatus 600) by the first load balancing apparatus (primary) 410 at fixed intervals.

Figure 6:
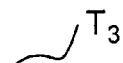
FIG. 6 is a diagram showing one example of the LBC operating status table $T_3$ shown in FIG. 3.

The LBC (Load balancing controller) operating status table $T_3$ shown in FIG. 6 shows the operating status ("stop" and "in operation") of the first load balancing apparatus (secondary) 420 (first load balancing apparatus (backup) 430). The LBC operating status table $T_3$ comprises "LBC Address" which represents the IP address of the first load balancing apparatus (secondary) 420 (first load balancing apparatus (backup) 430), "Operating status flag" (0: stop, 15: in operation) which shows the operating status of the first load balancing apparatus (secondary) 420 (first load balancing apparatus (backup) 430), and "secondary flag" which represents a secondary in the first load balancing apparatus group 400.

The LBC operating status table $T_3$ is created at the start-up of the first load balancing apparatus (primary) 410, is updated based on monitoring (LBC operating status monitoring thread $S_6$: see FIG. 3)of the first load balancing apparatus (secondary) 420 (first load balancing apparatus (backup) 430) by the first load balancing apparatus (primary) 410 at fixed time intervals.

Figure 7:
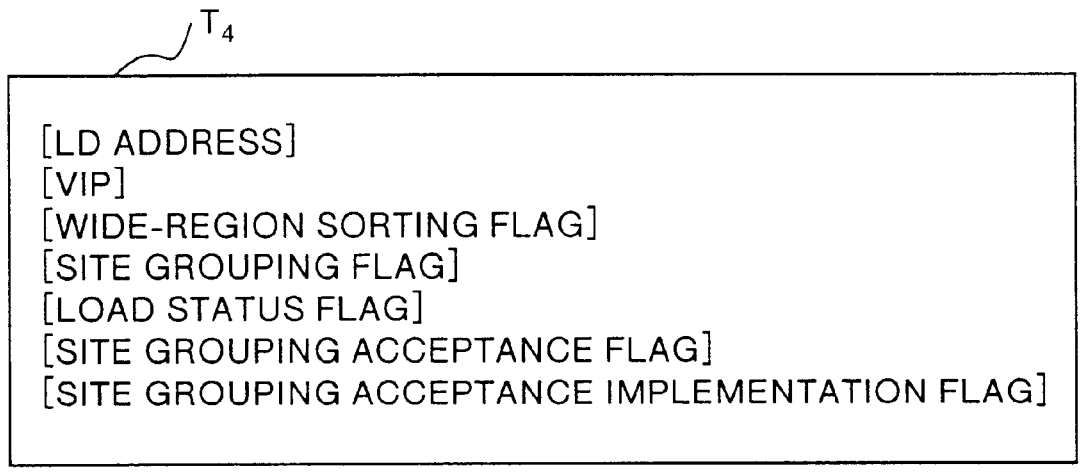
FIG. 7 is a diagram showing one example of the site load status table $T_4$ shown in FIG. 3.

The site load status table $T_4$ shown in FIG. 7 shows the load status in each site (service site $SS_1$ and service site $SS_2$: see FIG. 1). The site load status table $T_4$ comprises "LD address" which represents the IP address of the second load balancing apparatus 500 (the second load balancing apparatus 600), "VIP", and "Wide-region sorting flag" which shows whether or not the site is a target of wide-region sorting (wide-region load balancing) (OFF=target site, ON=not target site).

In the site load status table $T_4$, a "site group flag" (OFF=target site, ON=not target site) shows whether or not a site is a target of site grouping, wherein a plurality of sites are grouped together and a service request (IP packet) which cannot be completely processed at one site is transferred to another site. The "Load status flag" shows the load status (normal load or high load) of the site (normal load: OFF, high load: ON).

A "Site Grouping Acceptance flag" (Accepted: ON, Refused: OFF) shows whether or not the site has been accepted for grouping by other sites. A "Site Grouping Acceptance Implementation Flag" (Implement: ON, Not implemented: OFF) shows whether the site has implemented its grouping with another site. The site load status table $T_4$ is created at the start-up of the first load balancing apparatus (primary) 410, and is updated each time a wide-region load balancing monitoring thread $S_4$ (see FIG. 3) is executed and site load information is received.

Figure 8:
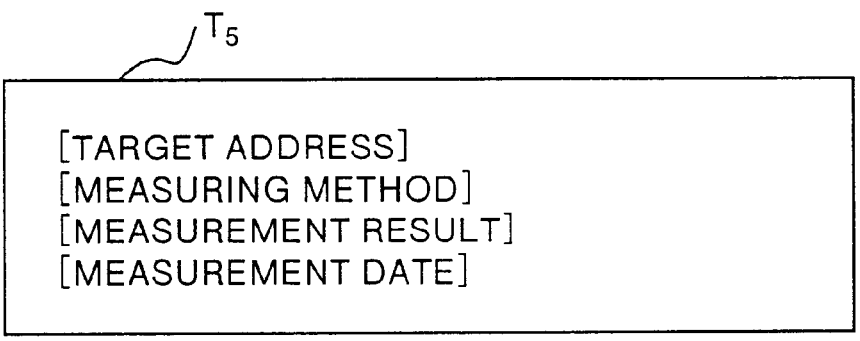
FIG. 8 is a diagram showing one example of the path load measurement table $T_5$ shown in FIG. 3.

The path load measurement table $T_5$ shown in FIG. 8 stores information such as the method used by the second load balancing apparatus 500 (the second load balancing apparatus 600) to measure its path load, and the results thereby obtained. The path load measurement table $T_5$ comprises the second load balancing apparatus 500 (the second load balancing apparatus 600) whose path load is to be measured, "Target Address" which shows the IP address of the client-side DNS server 110, "Measurement Method" which shows the method for measuring the path load, "Measurement Result" which shows the result of the path load measurement, and "Measurement Date" which shows the date of the measurement. The path load measurement table $T_5$ is updated when a path load measurement result total thread $S_9$ (explained later) is executed. The path load measurement results in the path load measurement table $T_5$ are reflected in the DNS sorting table $T_1$.

Figure 9:
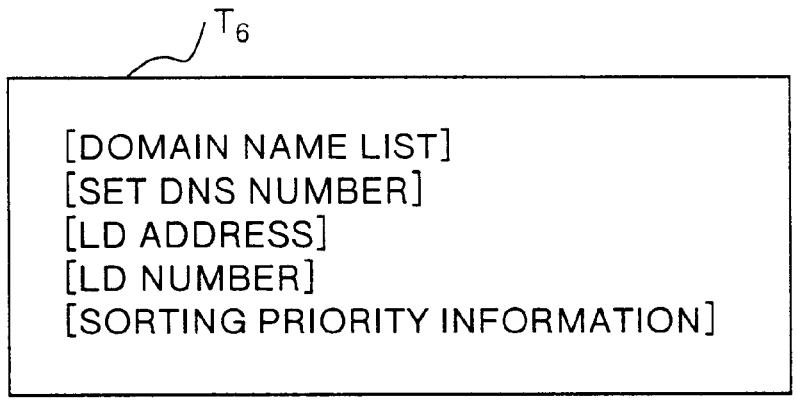
FIG. 9 is a diagram showing one example of the policy information table $T_6$ shown in FIG. 3.

The policy information table $T_6$ shown in FIG. 9 comprises "Domain Name List" which shows a list of the domain names used in the network system, "Set Number of DNS" which shows the number of DNS which have been set, "LD address" which shows the IP address of the second load balancing apparatus 500 (the second load balancing apparatus 600), "LD Number" which shows the number of the second load balancing apparatuses 500 (second load balancing apparatuses 600), and "Sorting Priority Information" which shows the first-sorting priority order in the first load balancing apparatus group 400.

Figure 10:
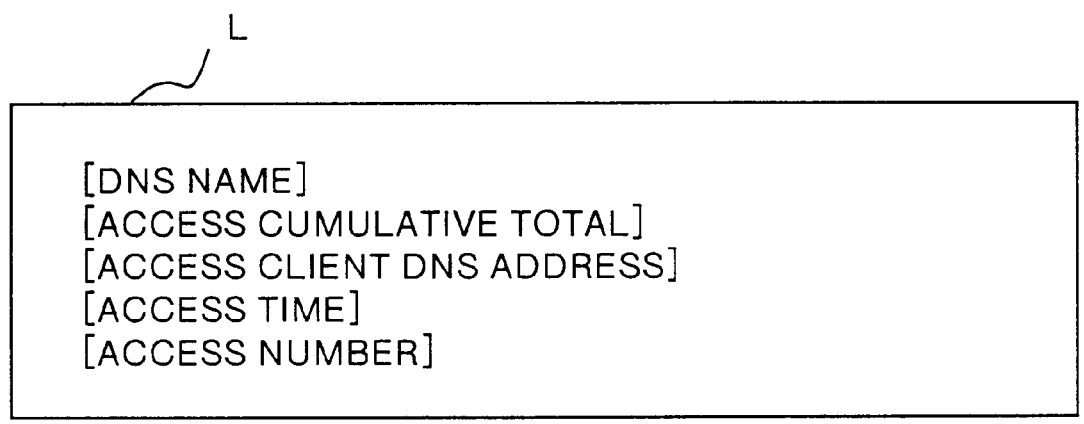
FIG. 10 is a diagram showing one example of the DNS access log L shown in FIG. 3.

The DNS access log shown in FIG. 10 is recorded each time a DNS inquiry is received from the client-side DNS server 110, and comprises the access total, the number of accesses, etc. Specifically, the DNS access log L comprises "DNS Name" which shows the DNS name of the client 100 which is the source of the inquiry, "Access Total" which shows the cumulative total of accesses, "Access client DNS address" which shows the IP address of the client-side DNS server 110, "Access time" which shows the access time, and "Access number" which shows the number of accesses.

Returning to FIG. 3, the site group sorting table $T_7$ shows the relationship between the sorting source site in the access grouping described above and the sorting destination site. In the first load balancing apparatus (primary) 410, the DNS response thread $S_1$ carries out processing relating to the DNS response to a DNS inquiry from the client-side DNS server 110.

A DNS sorting table distribution thread $S_2$ distributes the DNS sorting table $T_1$ to the first load balancing apparatus (secondary) 420 and the first load balancing apparatus (backup) 430, and is executed when the DNS sorting table $T_1$ is created and updated. Therefore, by executing the DNS sorting table distribution thread $S_2$ at fixed time intervals, synchronism is achieved between the contents of the DNS sorting table $T_1$ and the DNS sorting table $T_1'$ (see FIG. 11) in the first load balancing apparatus (primary) 410, the first load balancing apparatus (secondary) 420 and the first load balancing apparatus (backup) 430.

Figure 11:
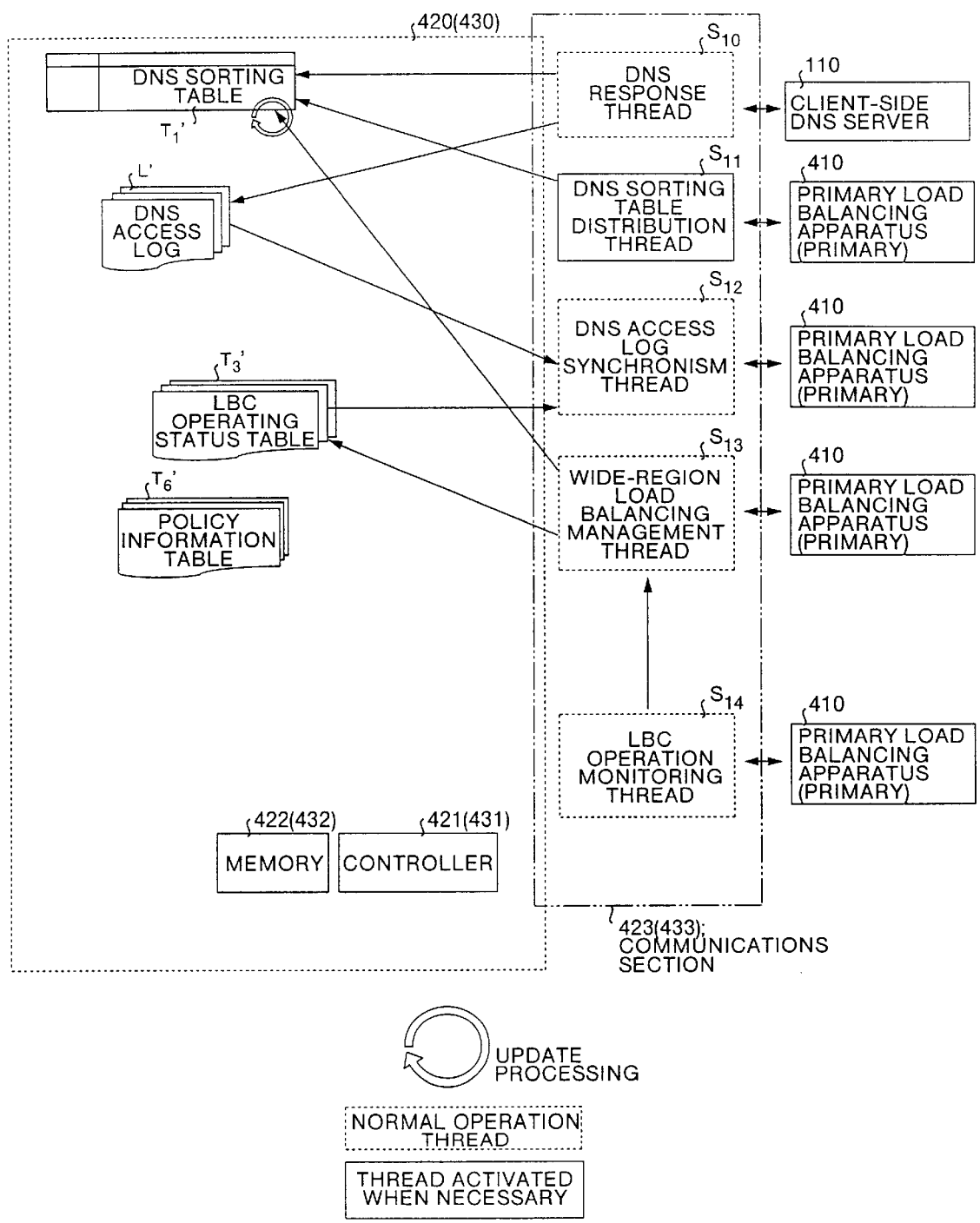
FIG. 11 is a block diagram showing the constitution of the first load balancing apparatus (secondary) 420 and the first load balancing apparatus (backup) 430 shown in FIG. 2.

A DNS access log synchronism thread $S_3$ carries out processing to achieve synchronism between the DNS access log L in the first load balancing apparatus (primary) 410 and the DNS access log L' in the first load balancing apparatus (secondary) 420 (the first load balancing apparatus (backup) 430) (see FIG. 11). A wide-region load balancing monitoring thread $S_4$ monitors the wide-region load balancing (updates and the like of the site drive status table $T_2$ and the site group sorting table $T_7$).

An LD operation monitoring thread $S_5$ monitors the operation of the second load balancing apparatus 500 (the second load balancing apparatus 600). The LBC operation monitoring thread $S_6$ monitors the operation of first load balancing apparatus (secondary) 420 (the first load balancing apparatus (backup) 430). A site group sorting distribution thread $S_7$ distributes the site group sorting table $T_7$ to the second load balancing apparatus 500 (the second load balancing apparatus 600).

A path load measurement request thread $S_8$ requests a measurement of the path load from the second load balancing apparatus 500 (the second load balancing apparatus 600). A path load measurement result total thread $S_9$ calculates the total of the path load measurement results from the second load balancing apparatus 500 (the second load balancing apparatus 600) after the path load has been measured.

Subsequently, the constitution of the first load balancing apparatus (secondary) 420 shown in FIG. 2 will be explained with reference to FIG. 11. In FIG. 11, identical reference codes are appended to sections corresponding to the sections in FIG. 2. The first load balancing apparatus (secondary) 420 comprises a controller 421, a memory 422, and a communications section 423 which communicates with external apparatuses (the client-side DNS server 110 and the first load balancing apparatus (primary) 410).

A DNS sorting table $T_1'$, an LBC operating status table $T_3'$, a policy information table $T_6'$ and a DNS access log L' are stored in the memory 422. The DNS sorting table $T_1'$, the LBC operating status table $T_3'$, the policy information table $T_6'$ and the DNS access log L' correspond to the DNS sorting table $T_1$, the LBC operating status table $T_3$, the policy information table $T_6$ and the DNS access log L shown in FIG. 3.

In the first load balancing apparatus (secondary) 420, a DNS response thread $S_{10}$ processes a DNS response to a DNS inquiry from the client-side DNS server 110. A DNS sorting table distribution thread $S_{11}$ receives the distribution of the DNS sorting table $T_1$ from the first load balancing apparatus (primary) 410.

A DNS access log synchronism thread $S_{12}$ synchronises the DNS access log L' in the first load balancing apparatus (secondary) 420 and the DNS access log L in the first load balancing apparatus (primary) 410. A wide-region load balancing management thread $S_{13}$ manages the wide-region load balancing in compliance with the first load balancing apparatus (primary) 410. An LBC operation monitoring thread $S_{14}$ monitors the operation of the first load balancing apparatus (primary) 410.

The constitution of the first load balancing apparatus (backup) 430 is basically identical to that of the first load balancing apparatus (secondary) 420 described above. That is, the first load balancing apparatus (backup) 430 comprises a controller 431, a memory 432 and a communications section 433.

Process of Monitoring the Operation

Figure 12:
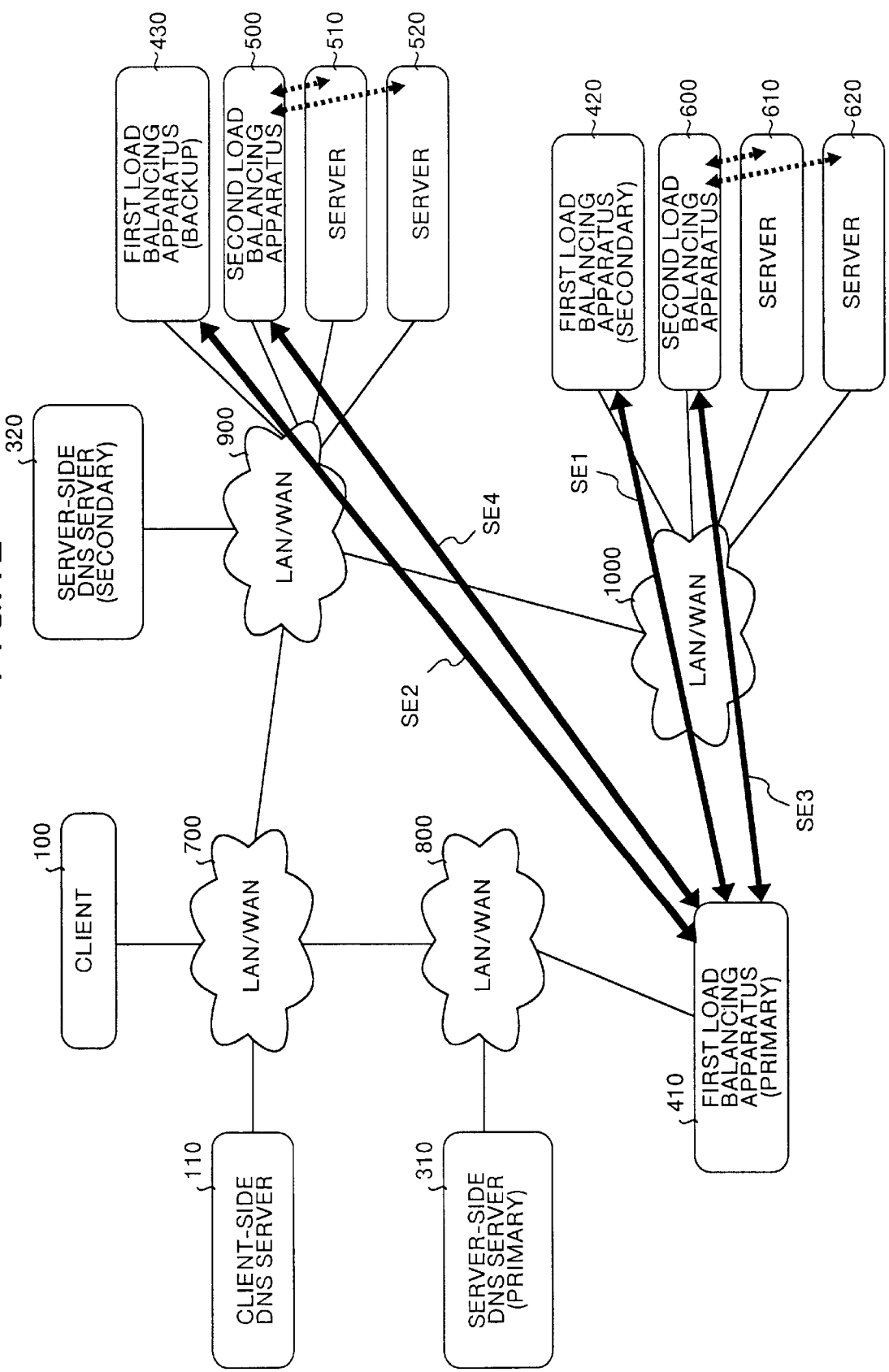
FIG. 12 is a diagram explaining operation monitoring in the same embodiment.

Subsequently, a process of monitoring the operation in the embodiment of this invention will be explained with reference to FIG. 12. In FIG. 12, the LD operation monitoring thread $S_5$ and the LBC operation monitoring thread $S_6$ (see FIG. 3) are executed at the start-up of the first load balancing apparatus (primary) 410. Consequently, the first load balancing apparatus (primary) 410 transmits operation monitor messages (steps SE1 to SE4) at fixed time intervals to the second load balancing apparatus 500, the second load balancing apparatus 600, the first load balancing apparatus (secondary) 420 and the first load balancing apparatus (backup) 430.

When the second load balancing apparatus 500 and the second load balancing apparatus 600 receive the operation monitor message, the second load balancing apparatus 500 and the second load balancing apparatus 600 each transmit an operation response message to the first load balancing apparatus (primary) 410 which is the source of the transmission.

When the first load balancing apparatus (secondary) 420 and the first load balancing apparatus (backup) 430 receive the operation monitor message, the first load balancing apparatus (secondary) 420 and the first load balancing apparatus (backup) 430 transmit an operation monitor message to the first load balancing apparatus (primary) 410 which is the source of the transmission by executing the LBC operation monitoring $S_{14}$ (see FIG. 11).

The first load balancing apparatus (primary) 410 remains in standby for a fixed period of time after transmitting the operation monitor messages. When an operation response message is received during this standby period, it is determined that the source apparatus is operating normally. On the other hand, when no operation response message is received within this fixed period of time, the first load balancing apparatus (primary) 410 retransmits the operation monitor message to the apparatus. Thereafter, the message is repeatedly transmitted for a fixed number of times (three defaults) and when an operation response message is still not received from the apparatus, the first load balancing apparatus (primary) 410 determines that the apparatus as stopped operating. A disaster, as described above, is one possible cause of the stoppage.

When it has been determined that second load balancing apparatus 500 (or the second load balancing apparatus 600) has stopped operating (i.e. due to a disaster), the first load balancing apparatus (primary) 410 changes the "Operating status flag" in the site drive status table $T_2$ to "0" (=operation stopped) shown in FIG. 5.

Moreover, the first load balancing apparatus (primary) 410 changes the "LD operating status code" in the LD information table $T_c$ of the DNS sorting table $T_1$ shown in FIG. 4 to 0x0002 (=stop) and changes the operating status of the second load balancing apparatus 500 (the second load balancing apparatus 600) in the site group sorting table $T_7$ shown in FIG. 3 to "stop". As a consequence, the second load balancing apparatus 500 (the second load balancing apparatus 600) is excluded from the targets for first-sorting.

The first load balancing apparatus (primary) 410 notifies the first load balancing apparatus (secondary) 420 and the first load balancing apparatus (backup) 430 that the second load balancing apparatus 500 (the second load balancing apparatus 600) has stopped operating. Consequently, the first load balancing apparatus (secondary) 420 and the first load balancing apparatus (backup) 430 each update the DNS sorting table $T_1'$ (see FIG. 11), thereby eliminating the second load balancing apparatus 500 (the second load balancing apparatus 600) from the targets for primary sorting.

In the case where it has been determined that the first load balancing apparatus (backup) 430 (or the first load balancing apparatus (secondary) 420) has stopped operating (i.e. due to a disaster), the first load balancing apparatus (primary) 410 changes the "operating status flag" in the LBC operating status table $T_3$ shown in FIG. 6 to "0" (=stopped operation).

Thereafter, the first load balancing apparatus (primary) 410 transmits operation monitor messages at fixed time intervals to the apparatuses which have been determined to have stopped operating (e.g. the second load balancing apparatus 500, the first load balancing apparatus (secondary) 420, and the like). However, in this case, the operation monitor messages cannot transmit again. When an operation response message is received from an apparatus which has been determined to have stopped operating, the first load balancing apparatus (primary) 410 transmits a primary announcement to the apparatus. After receiving this primary announcement, the apparatus transmits a primary acknowledgment message to the first load balancing apparatus (primary) 410.

When the first load balancing apparatus (primary) 410 receives this primary acknowledgment message, the first load balancing apparatus (primary) 410 updates the DNS sorting table $T_1$ and the site drive status table $T_2$ (or the LBC operating status table $T_3$) to "in operation". In the case where the first load balancing apparatus (secondary) 420 has stopped operating (i.e. due to disaster), the first load balancing apparatus (primary) 410 deems the first load balancing apparatus (backup) 430 as a secondary instead of the first load balancing apparatus (secondary) 420 by setting the "secondary flag" in the LBC operating status table $T_3$ (see FIG. 6) to the first load balancing apparatus (backup) 430.

In the case where the first load balancing apparatus (primary) 410 and/or a link to the first load balancing apparatus (primary) 410 suffers a disaster with a consequence that the operation monitor message from the first load balancing apparatus (primary) 410 is not received by the first load balancing apparatus (secondary) 420 even when a predetermined period of time has elapsed (=previous operation monitoring time+operation monitoring time+ standby time), the first load balancing apparatus (secondary) 420 performs the following operation. In this example, the standby time is the time required by the first load balancing apparatus (secondary) 420 to automatically promote itself from secondary to primary.

In this case, the first load balancing apparatus (secondary) 420 determines that the first load balancing apparatus (primary) 410 has been destroyed and transmits a primary announcement to the first load balancing apparatus (backup) 430, the second load balancing apparatus 500 and the second load balancing apparatus 600.

When the first load balancing apparatus (backup) 430, the second load balancing apparatus 500 and the second load balancing apparatus 600 have received the primary announcement, they send a primary acknowledgment message to the first load balancing apparatus (secondary) 420. The first load balancing apparatus (secondary) 420 receives this primary acknowledgment message and functions as a primary instead of the first load balancing apparatus (primary) 410. Thereafter, the first load balancing apparatus (secondary) 420 performs the same operations as the first load balancing apparatus (primary) 410.

In a case where the first load balancing apparatus (secondary) 420 stops operating due to disaster simultaneous to the first load balancing apparatus (primary) 410, the first load balancing apparatus (secondary) 420 cannot transmit the primary announcement. Therefore, in this case, no primary announcement is received by the first load balancing apparatus (backup) 430 after the predetermined period of time has elapsed. Consequently, the first load balancing apparatus (backup) 430 searches for a primary. In this case, a higher-level first load balancing apparatus, or the first load balancing apparatus which first searched for the primary, becomes the primary.

When the first load balancing apparatus (primary) 410 has been restored and resumes operation, the first load balancing apparatus (primary) 410 transmits a primary announcement showing that it is the original primary to the first load balancing apparatus (secondary) 420, the first load balancing apparatus (backup) 430, the second load balancing apparatus 500 and the second load balancing apparatus 600.

When the first load balancing apparatus (secondary) 420 which is the present primary receives the above-mentioned primary announcement, the first load balancing apparatus (secondary) 420 confirms that the first load balancing apparatus (primary) 410 is the original primary and transmits a load balancing send message to end load balancing to the first load balancing apparatus (backup) 430, the second load balancing apparatus 500 and the second load balancing apparatus 600 which are having their loads balanced.

As a consequence, the second load balancing apparatus 500, the second load balancing apparatus 600 and the first load balancing apparatus (backup) 430 transmit a participation cancellation message which cancels their participation in the load balancing wherein the first load balancing apparatus (secondary) 420 is the primary.

Then, the first load balancing apparatus (secondary) 420 transmits a participation application message requesting participation in load balancing with the transmission source of the primary announcement (the first load balancing apparatus (primary) 410) as the primary to the first load balancing apparatus (backup) 430, the second load balancing apparatus 500 and the second load balancing apparatus 600. The first load balancing apparatus (secondary) 420, the first load balancing apparatus (backup) 430, the second load balancing apparatus 500 and the second load balancing apparatus 600 each transmit a participation message to participate in the load balancing with the first load balancing apparatus (primary) 410 as the primary to the first load balancing apparatus (primary) 410. As a result, the status prior to the disaster is automatically restored.

In a case where the operation monitor message from the first load balancing apparatus (primary) 410 is not received by the first load balancing apparatus (backup) 430 due to a disaster or the like even though the predetermined period of time (=previous operation monitoring time+operation monitoring time+standby time) has elapsed, the first load balancing apparatus (backup) 430 performs the following operation. The first load balancing apparatus (backup) 430 determines that the first load balancing apparatus (primary) 410 has been destroyed, and determines whether or not a primary announcement has been received from the first load balancing apparatus (secondary) 420 within the standby time.

When the primary announcement has been received within the standby time, the first load balancing apparatus (backup) 430 transmits the above-mentioned primary acknowledgment message to the first load balancing apparatus (secondary) 420. On the other hand, when the primary announcement is not received within the standby time, the first load balancing apparatus (backup) 430 searches for a first load balancing apparatus which can become the primary.

In a case where the operation monitor message from the first load balancing apparatus (primary) 410 is not received by the second load balancing apparatus 500 (the second load balancing apparatus 600) due to a disaster or the like even though the predetermined period of time (=previous operation monitoring time+operation monitoring time+standby time) has elapsed, the second load balancing apparatus 500 (the second load balancing apparatus 600) performs the following operation. The second load balancing apparatus 500 (the second load balancing apparatus 600) determines that the first load balancing apparatus (primary) 410 has been destroyed, and determines whether or not a primary announcement has been received from the first load balancing apparatus (secondary) 420 within the standby time.

When the primary announcement has been received within the standby time, the second load balancing apparatus 500 (the second load balancing apparatus 600) transmits the above-mentioned primary acknowledgment message to the first load balancing apparatus (secondary) 420. On the other hand, when the primary announcement is not received within the standby time, the second load balancing apparatus 500 (the second load balancing apparatus 600) searches for a first load balancing apparatus which can become the primary.

Process of Collecting Load Information

Figure 13:
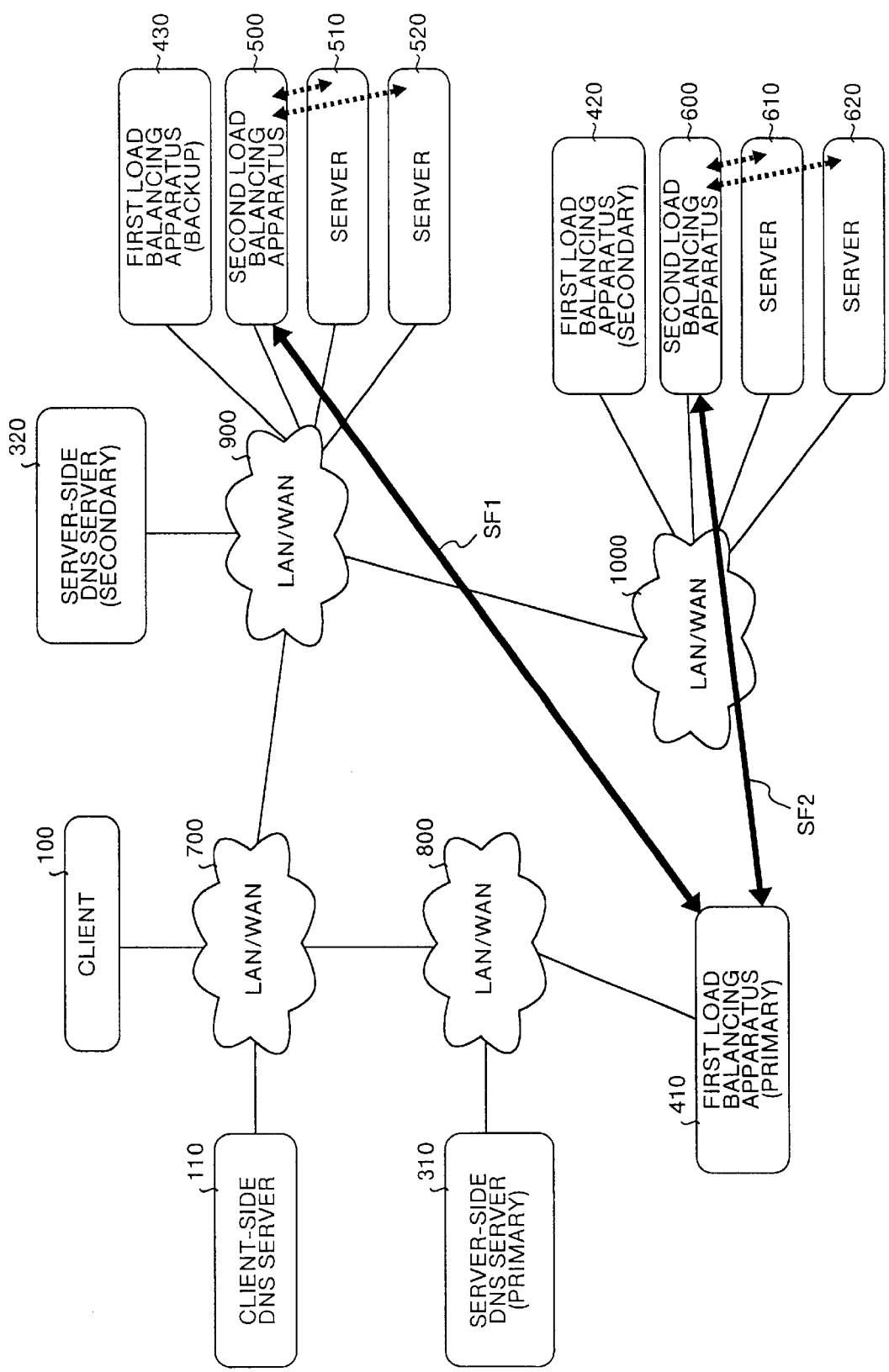
FIG. 13 is a diagram explaining site load information collecting in the same embodiment.

Subsequently, a process of collecting load information in the embodiment of this invention will be explained with reference to FIG. 13. In FIG. 13, the wide-region load balancing managing thread $S_4$ (see FIG. 3) is executed at the start-up of the first load balancing apparatus (primary) 410. Consequently, the first load balancing apparatus (primary) 410 transmits a request to measure the load status (steps SF1 to SF2) to the second load balancing apparatus 500 (the second load balancing apparatus 600).

Consequently, the second load balancing apparatus 500 measures the load status (high load, normal load) of the server 510 and the server 520 by means of the amount of IP packets passed and a measurement agent. Similarly, the second load balancing apparatus 600 measures the load status of the server 610 and the server 620. Then, the second load balancing apparatus 500 and the second load balancing apparatus 600 send the load statuses as site load information to the first load balancing apparatus (primary) 410. The first load balancing apparatus (primary) 410 receives this site load information and updates the site load status table $T_4$ (see FIG. 7). Thereafter, load information is collected at fixed time intervals.

Process of DNS Access Log Collection

Figure 14:
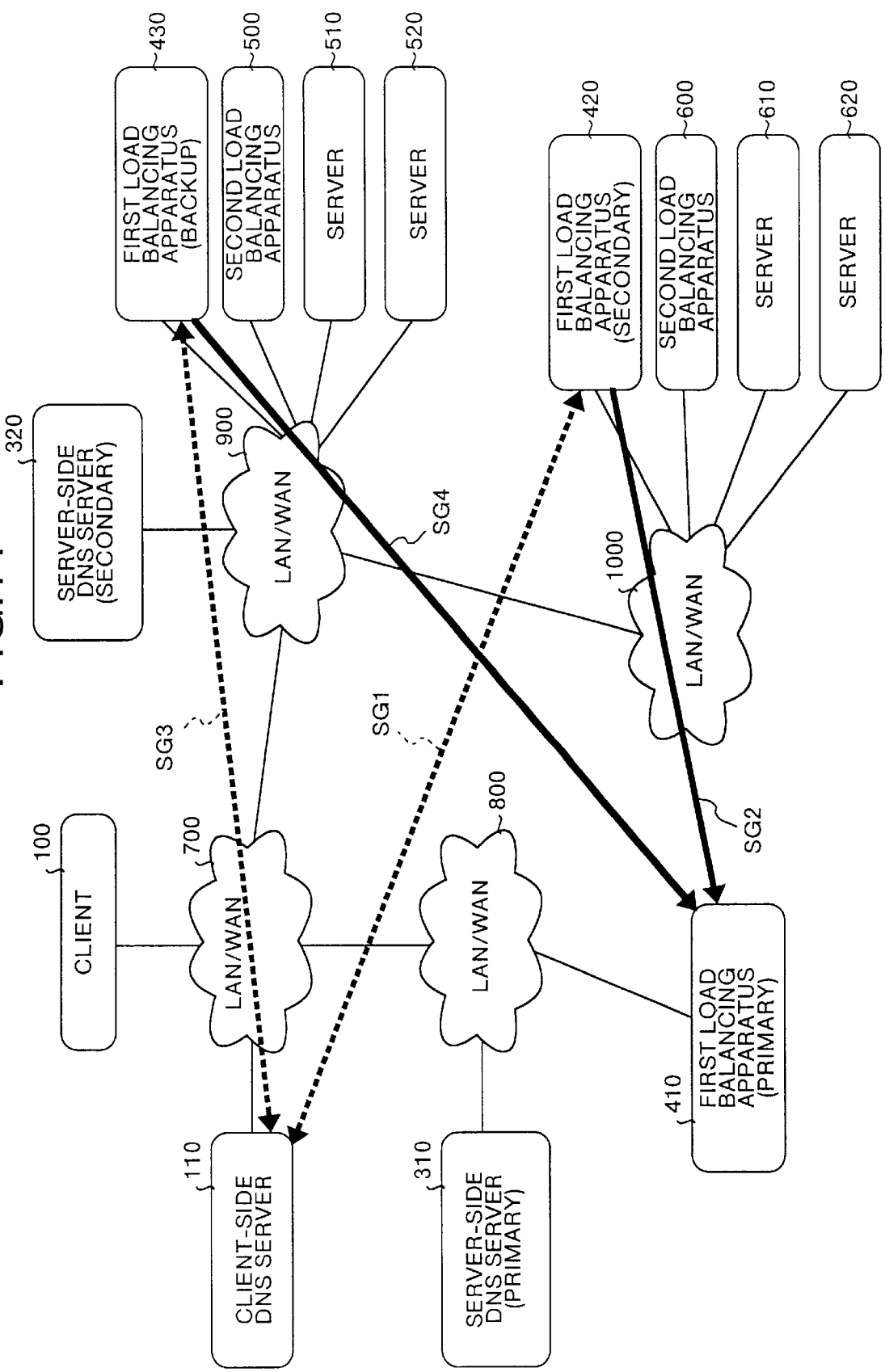
FIG. 14 is a diagram explaining DNS access log L collection in the same embodiment.

Subsequently, a process of DNS access log collection in this embodiment will be explained with reference to FIG. 14. In FIG. 14, when the client-side DNS server 110 transmits a DNS inquiry to the first load balancing apparatus (secondary) 420 in a step SG1, the first load balancing apparatus (secondary) 420 updates the DNS access log L' (see FIG. 11). Similarly, when the client-side DNS server 110 transmits a DNS inquiry to the first load balancing apparatus (backup) 430 in a step SG3, the first load balancing apparatus (backup) 430 updates the DNS access log L' (see FIG. 11).

In a step SG2, the first load balancing apparatus (secondary) 420 executes the DNS access log synchronism thread $S_{12}$ (see FIG. 11) at fixed time intervals. That is, the first load balancing apparatus (secondary) 420 transmits the DNS access log L' to the first load balancing apparatus (primary) 410. Similarly, in a step SG4, the first load balancing apparatus (backup) 430 executes the DNS access log synchronism thread $S_{12}$ (see FIG. 11) at fixed time intervals. That is, the first load balancing apparatus (backup) 430 transmits the DNS access log L' to the first load balancing apparatus (primary) 410.

When the first load balancing apparatus (primary) 410 has received the DNS access log L', the first load balancing apparatus (primary) 410 executes the DNS access log synchronism thread $S_3$, totalizes the DNS access logs L' from the first load balancing apparatus (secondary) 420 and the first load balancing apparatus (backup) 430, and writes the totalized result in the DNS access log L (see FIG. 10).

Process of Collecting Information Relating to the Path Load

Figure 15:
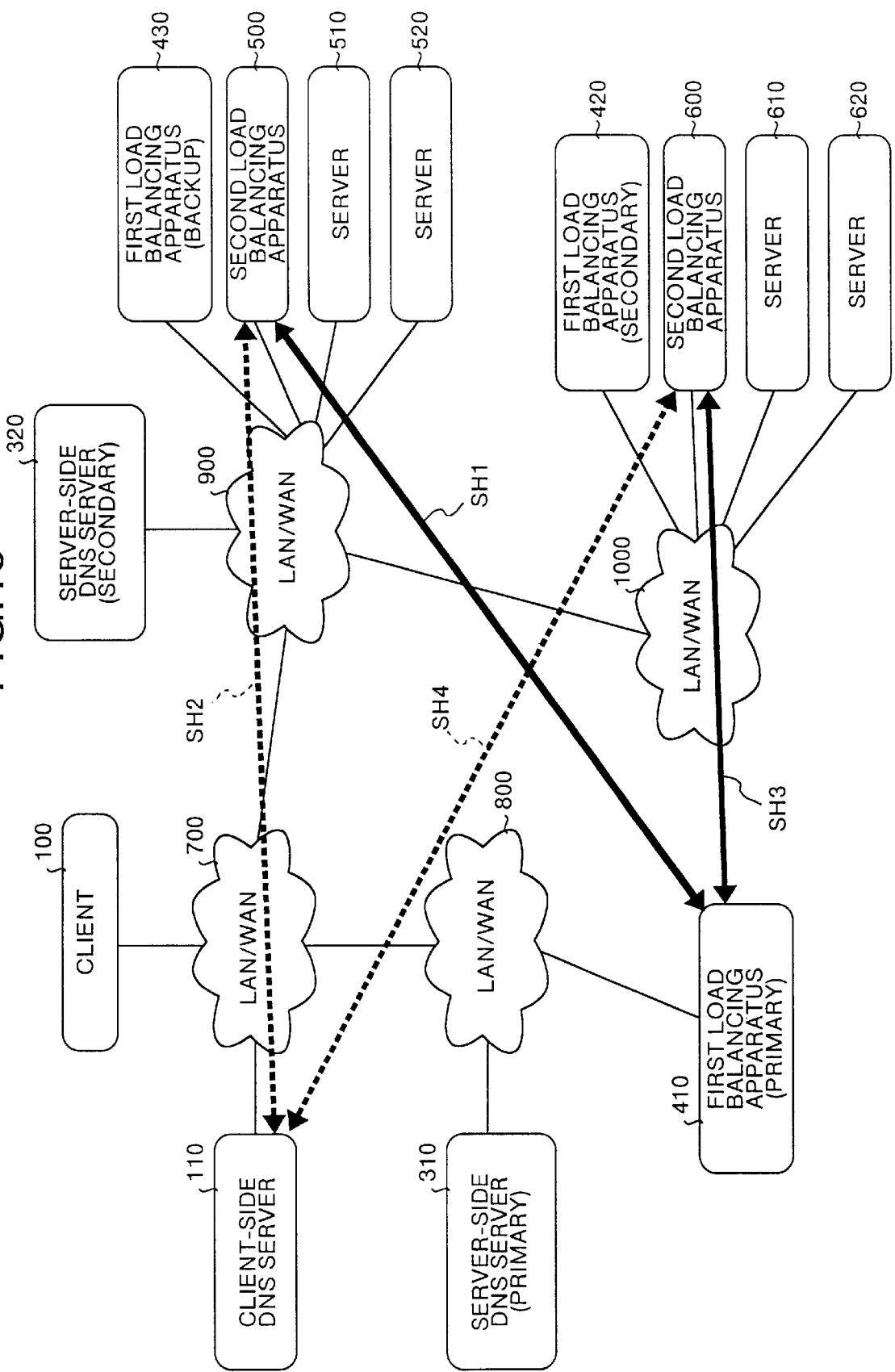
FIG. 15 is a diagram explaining path load information collection in the same embodiment.

Subsequently, a process of collecting information relating to the path load will be explained with reference to FIG. 15. In FIG. 15, the first load balancing apparatus (primary) 410 executes the path load measurement request thread $S_8$. That is, the first load balancing apparatus (primary) 410 consults the DNS access log L and selects a server, e.g. the client-side DNS server 110, which has recently been accessed and has not had its path load measured.

In a step SH1, the first load balancing apparatus (primary) 410 sends a request to measure the path load to the second load balancing apparatus 500. Consequently, in a step SH2, the second load balancing apparatus 500 determines the effective bandwidth of the communications path based on information such as the roundtrip time in the communications path between the second load balancing apparatus 500 and the client-side DNS server 110, the maximum segment size, the average congestion window size, and the like.

Specifically, the second load balancing apparatus 500 transmits an SYN (Synchronous idle character) packet to the client-side DNS server 110. Then, the second load balancing apparatus 500 receives an ACK (Acknowledge character) packet for reply from the client-side DNS server 110. The second load balancing apparatus 500 determines the roundtrip time as the difference between the time at which the ACK packet was received and the time at which the SYN was transmitted.

Then, the second load balancing apparatus 500 determines the maximum window size (unit: bite) in the following way. In TCP communications, the size of a packet is determined based on the maximum transmission unit (MTU) of a router on the communications path. When multiple routers for relay are provided on the communications path, the minimum value of the maximum communications unit becomes the maximum segment size of the TCP communication. Therefore, the second load balancing apparatus 500 detects the MTU of the router on the communications path to the client-side DNS server 110 and sets the minimum MTU as the maximum segment size.

The second load balancing apparatus 500 determines the average congestion window size (unit: packet) in the following way. In TCP communications, packets are transmitted by a sliding window method while restricting their output. The second load balancing apparatus 500 sends the packets to the client-side DNS server 110 while restricting the number of packets which are transmitted in a single operation in a unit termed a window size. Thereafter, the second load balancing apparatus 500 confirms that a window-sized quantity of packets has been transferred based on a receive confirmation packet from the client-side DNS server 110.

The second load balancing apparatus 500 obtains the above-mentioned window size by determining the number of packets transmitted in one window cycle based on log information relating to packets which have transmitted and received the above-mentioned window size. In the case where the receive confirmation from the client-side DNS server 110 does not arrive within a predetermined period of time, the second load balancing apparatus 500 determines that the communications path (network) is congested and adjusts the window size. The window size is adjusted by using a congestion-avoidance algorithm.

When the receive confirmation packet has not arrived within the predetermined time (i.e. when the packet has been destroyed), the second load balancing apparatus 500 reduces the window size and thereafter increases the window size one by one until a packet is destroyed again. When the packet is destroyed again, the window size is reduced again to half its size and the same process is repeated. The second load balancing apparatus 500 determines an average congestion window size from the average value of the window size during the execution of the above congestion-avoidance algorithm.

Subsequently, the second load balancing apparatus 500 determines the effective bandwidth (transfer speed) in the communications path to the client-side DNS server 110 based on the roundtrip time, the maximum segment size and the average congestion window size. Specifically, the second load balancing apparatus 500 determines the effective bandwidth by inserting the values into the following equation (1):

$$BW = W \times MSS / RTT \quad (1)$$

wherein BW represents the effective bandwidth (bites/sec), RTT represents the roundtrip time (msec), MSS represents the maximum segment size (bites), and W represents the average congestion window size (packets).

Similarly, in a step SH3, the first load balancing apparatus (primary) 410 sends a request to measure the path load to the second load balancing apparatus 600. Consequently, in a step SH4, the second load balancing apparatus 600 determines the effective bandwidth of the communications path to the client-side DNS server 110 by using the same method as that used by the second load balancing apparatus 500.

The second load balancing apparatus 500 and the second load balancing apparatus 600 transmit the respective effective bandwidths as path load measurement results to the first load balancing apparatus (primary) 410. Consequently, the path load measurement result total thread $S_9$ is executed, whereby the first load balancing apparatus (primary) 410 calculates the total of the path load measurement results and updates the path load measurement table $T_5$ (see FIG. 8) based on the total result.

Access Process

Figure 16:
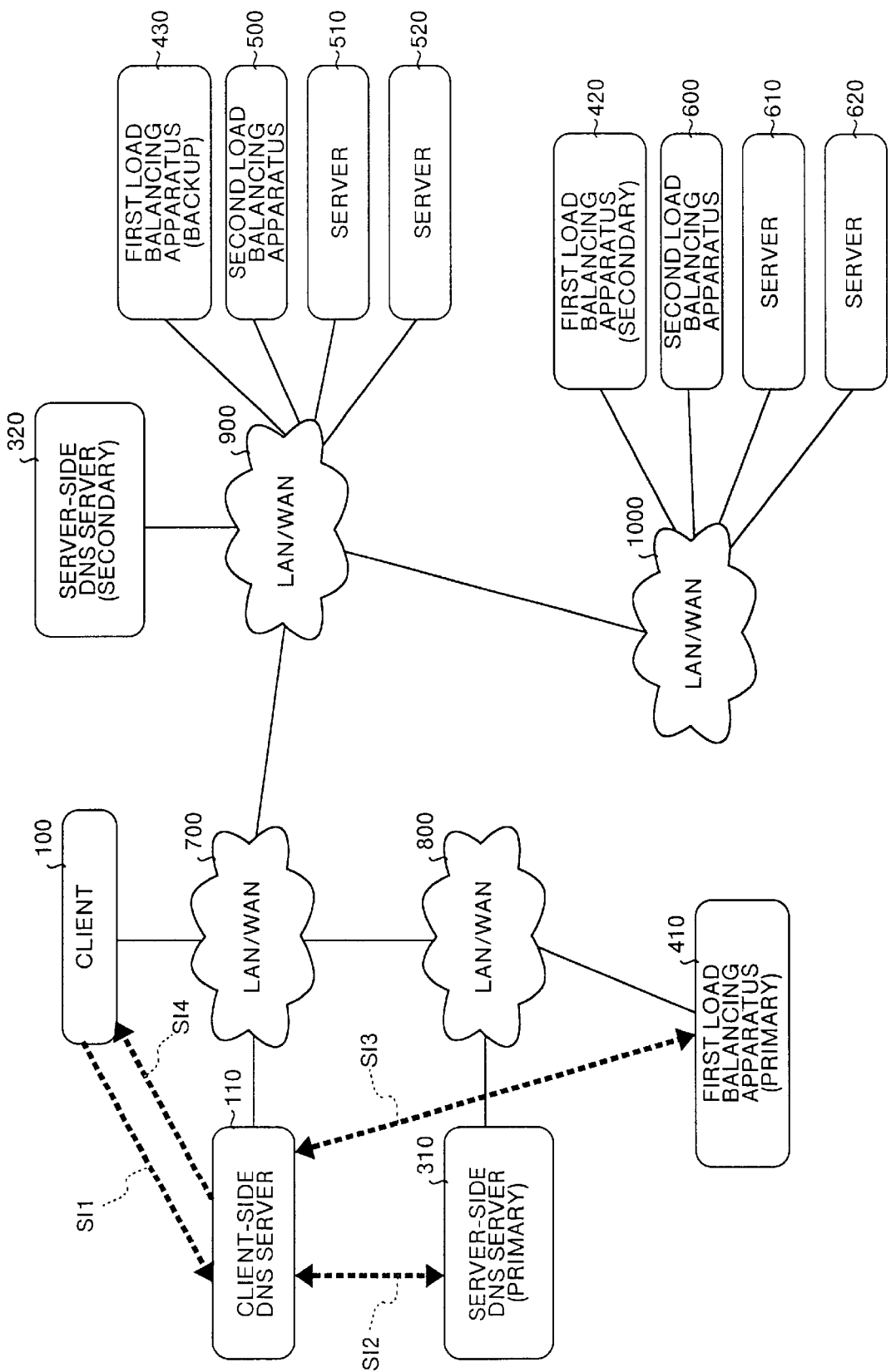
FIG. 16 is a diagram explaining an access process in the same embodiment.

Subsequently, an access process in this embodiment will be explained with reference to FIGS. 16 and 17. In FIG. 16, in a step SI1 the client 100 sends a DNS inquiry based on a representative domain name to the client-side DNS server 110. The client-side DNS server 110 determines whether the IP address of the second load balancing apparatus 500 or the second load balancing apparatus 600 which is the response is stored in the cash memory of the client-side DNS server 110. In the case where the IP address is stored, in a step SI4 the IP address is sent as the response to the client 100.

On the other hand, when the IP address required for response is not stored in the cash memory, in a step SI2 the client-side DNS server 110 sends a DNS inquiry to the server-side DNS server (primary) 310 having jurisdiction over the DNS for which the inquiry was made. The server-side DNS server (primary) 310 responds by sending the IP addresses of the first load balancing apparatus (primary) 410, the first load balancing apparatus (secondary) 420 and the first load balancing apparatus (backup) 430 to the client-side DNS server 110.

In a step SI3, the client-side DNS server 110 uses one of the three received IP addresses to access, for example the IP address of the first load balancing apparatus (primary) 410, and accesses the first load balancing apparatus (primary) 410. That is, the client-side DNS server 110 sends a DNS inquiry to the first load balancing apparatus (primary) 410.

Consequently, the first load balancing apparatus (primary) 410 consults the DNS sorting table $T_1$ and sends a site (i.e. an IP address of a second load balancing apparatus) having an entirely balanced load to the client-side DNS server 110. In this example, the first load balancing apparatus (primary) 410 responds by sending the IP address of the second load balancing apparatus 600. In a step SI4, the client-side DNS server 110 sends this IP address to the client 100.

Figure 17:
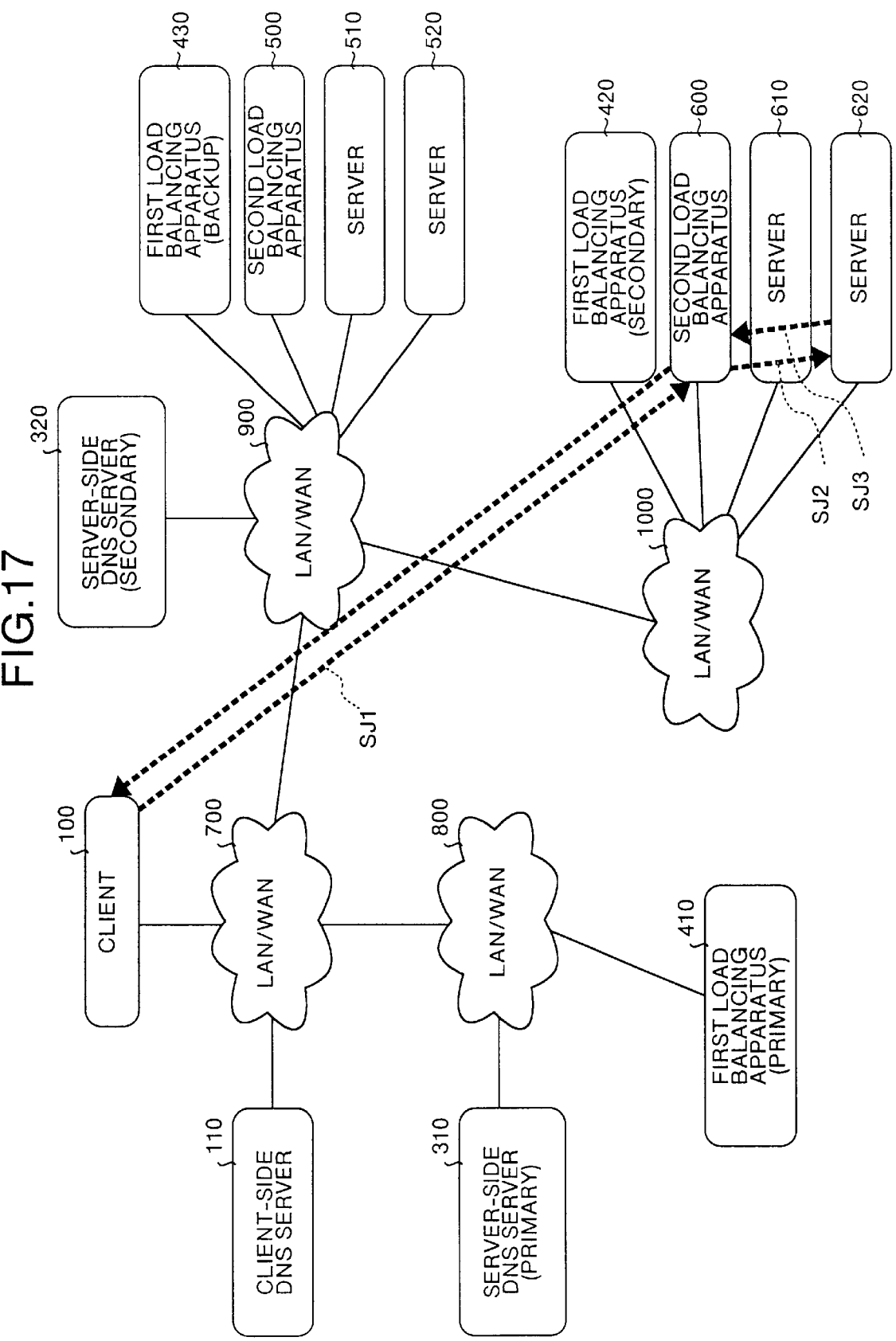
FIG. 17 is a diagram explaining an access process in the same embodiment.
Figure 18:
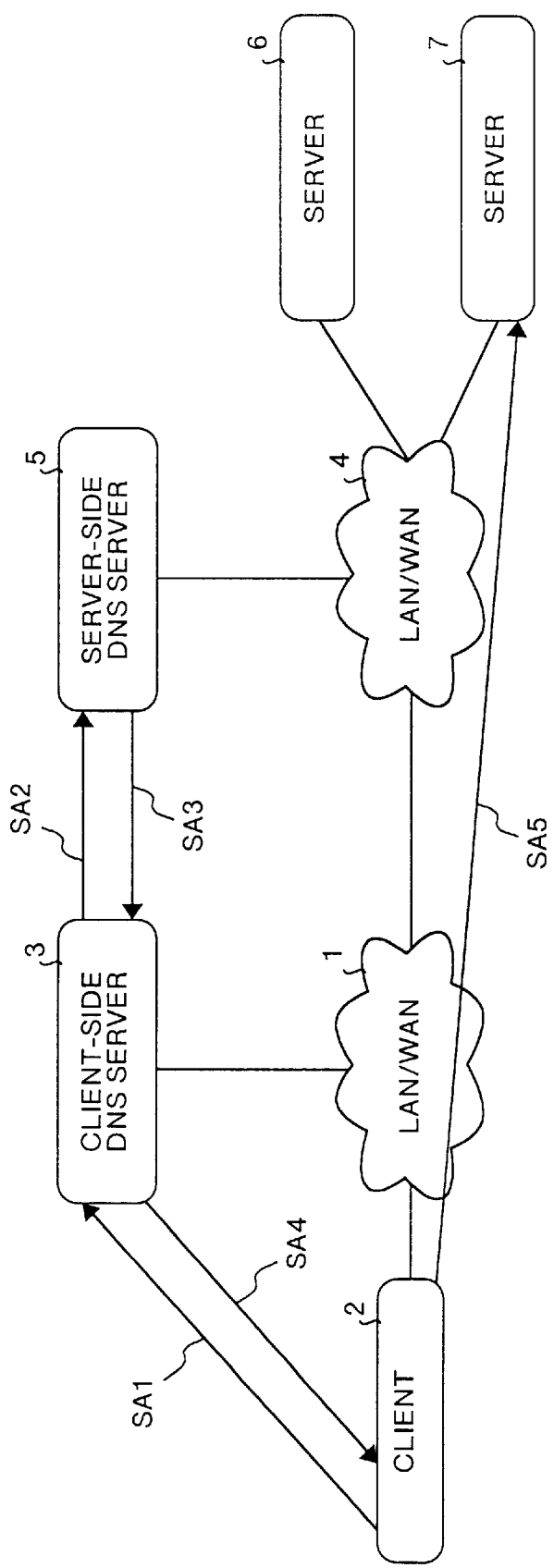
FIG. 18 is a diagram showing one example of a constitution of a conventional network system.
Figure 19:
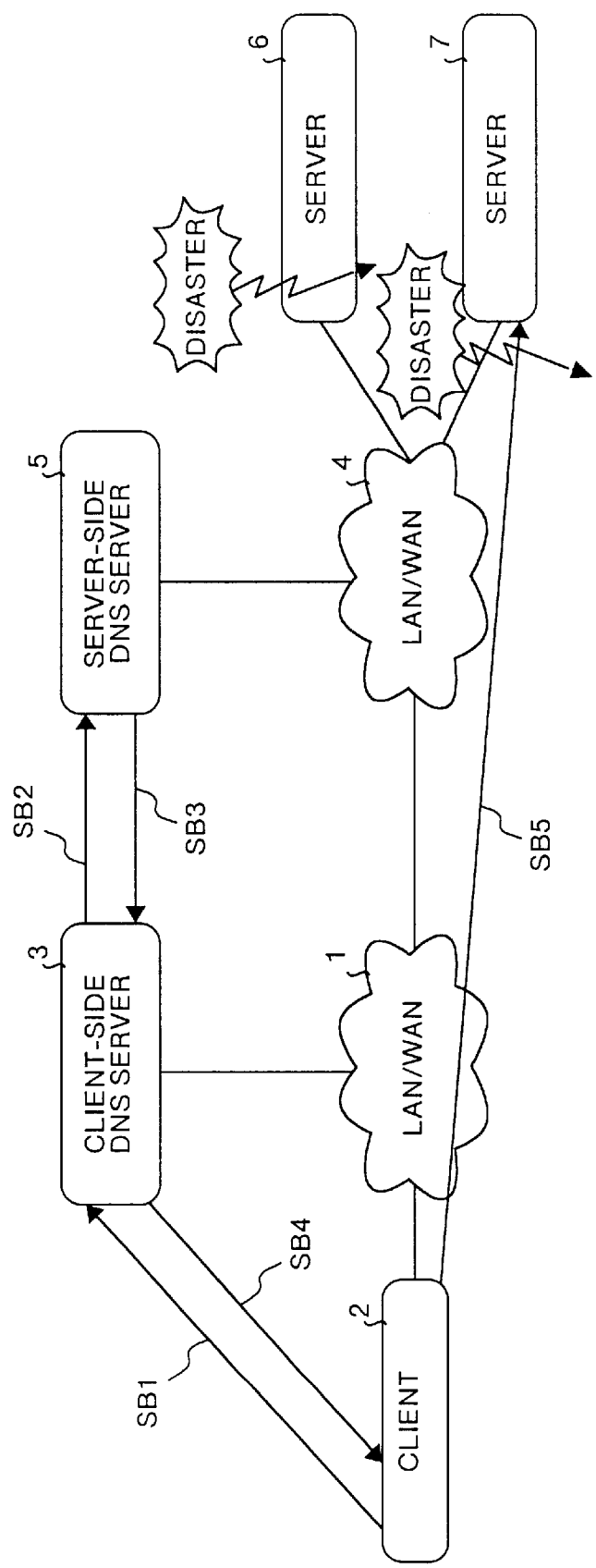
FIG. 19 is a diagram showing an operation when a disaster occurs in the example constitution of the conventional network system.
Figure 20:
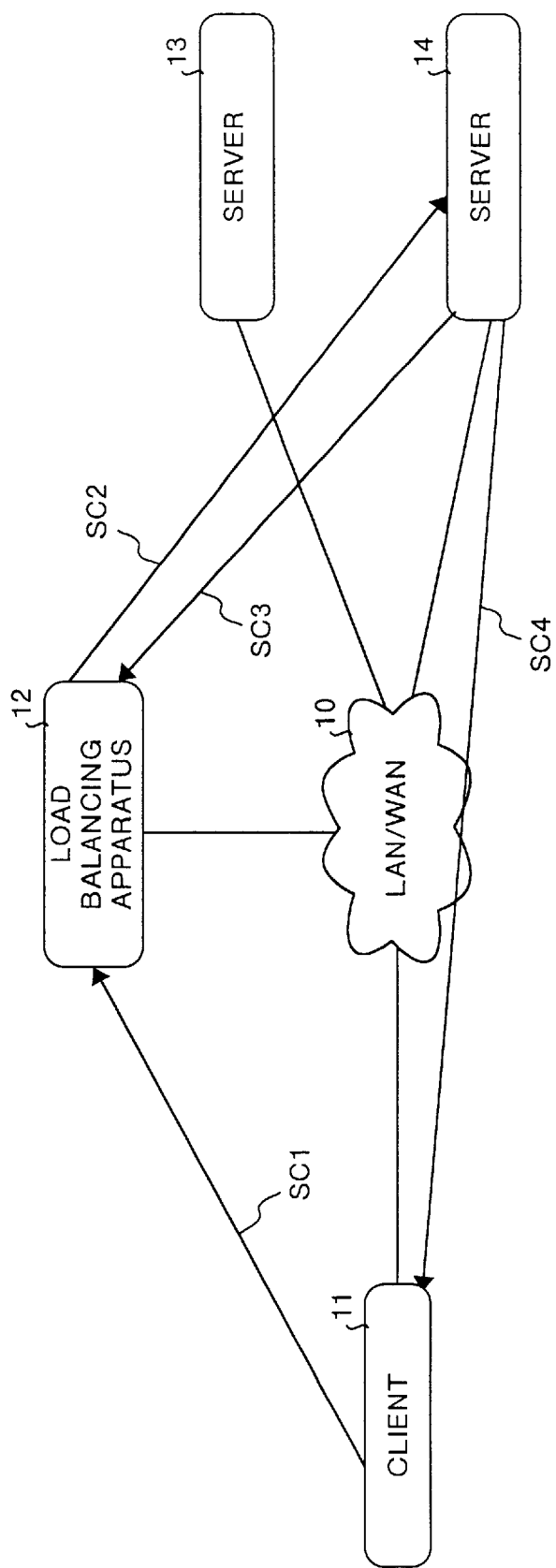
FIG. 20 is a diagram showing a second example of the constitution of a conventional network system.

Consequently, in a step SJ1 of FIG. 17, the client 100 accesses the second load balancing apparatus 600 based on the above-mentioned IP address. In a step SJ2, the second load balancing apparatus 600 sorts the IP packet (service request) received from the client 100 to, for example, the server 620 by using NAT and MAC. In a step SJ3, the server 620 transmits a reply packet for supplying service via the second load balancing apparatus 600 or directly to the client 100. As a consequence, the service is supplied from the server 620 to the client 100.

According to the embodiment described above, the first load balancing apparatus (primary) 410 is set as the primary and monitors the operating status of the first load balancing apparatus (secondary) 420, the first load balancing apparatus (backup) 430, the second load balancing apparatus 500 and the second load balancing apparatus 600. When one of these apparatuses stops operating, the first load balancing apparatus (primary) 410 excludes that apparatus from the load balancing apparatuses, thereby preventing the service from stopping due to a disaster.

Furthermore, according to the embodiment, the first load balancing apparatus (secondary) 420 is set beforehand as a secondary. Therefore, when the first load balancing apparatus (primary) 410 stops operating, the first load balancing apparatus (secondary) 420 can immediately be allowed to function as a primary, thereby avoiding the fatal problem of there being no primary.

Furthermore, according to the embodiment, when the first load balancing apparatus (primary) 410 which had stopped operating starts operating again, the first load balancing apparatus (secondary) 420 which is functioning as the primary at that point is automatically replaced by the first load balancing apparatus (primary) 410. Therefore, according to this embodiment, the operating status of the first load balancing apparatus (primary) 410 which has stopped operating is mutually monitored, thereby making it possible to immediately switch to the first load balancing apparatus (primary) 410 from the first load balancing apparatus (secondary) 420 which was functioning as the primary at the point where the first load balancing apparatus (primary) 410 recovered.

Furthermore, according to this embodiment, the first load balancing apparatus (primary) 410, the first load balancing apparatus (secondary) 420, the first load balancing apparatus (backup) 430, the second load balancing apparatus 500 and the second load balancing apparatus 600 are provided physically separate over a wide region. Therefore, damage can be kept to a minimum even when a disaster (such as an earthquake) occurs locally. As a consequence, service stoppage caused by damage due to the disaster can be more effectively avoided.

Furthermore, according to this embodiment, the DNS sorting table $T_1$, which is created and updated by the first load balancing apparatus (primary) 410, is distributed to the other first load balancing apparatus (secondary) 420 and the first load balancing apparatus (backup) 430. Therefore, problems arising from update misses can be prevented, since all the load balancing apparatuses (primary) 410, (secondary) 420 and (backup) 430 carry out primary sorting based on the same reference.

Furthermore, according to this embodiment, load is primary-sorted based on the DNS sorting table $T_1$ which reflects measurements of the actual load in the server 510, the server 520, the server 610 and the server 620. Therefore, the load can be balanced in accordance with the actual load.

In addition, according to this embodiment, primary sorting is performed based on the DNS sorting table $T_1$ which reflects the path load. Therefore, the load can be balanced in accordance with the status of the communications path.

As described above, according to a first aspect of this invention, the primary first load balancing unit is set, and this first load balancing unit monitors the operating statuses of the other first load balancing unit and the plurality of second load balancing units. When one of the units stops operating, it is excluded from the units which perform load balancing. Therefore, there is an advantage that it is possible to prevent the service from stopping due to a disaster.

Furthermore, according to the invention of the second aspect, since the secondary first load balancing unit is set beforehand, when the primary first load balancing unit stops operating, the secondary first load balancing unit can immediately function as a primary first load balancing unit. Therefore, there is an advantage that the fatal problem of there being no primary can be avoided.

Furthermore, according to the invention of the third aspect, the operating status of the first load balancing unit which has stopped operating is mutually monitored. Therefore, there is an advantage that it is possible to immediately switch the primary to the original primary at the point where the first load balancing unit recovered.

Furthermore, according to the invention of the fourth aspect, the plurality of first load balancing units and the plurality of second load balancing units are physically dispersed across a wide region. Therefore, damage can be kept to a minimum even when a disaster (such as an earthquake) occurs locally. Therefore, there is an advantage that service stoppage caused by damage due to the disaster can be more effectively avoided.

Furthermore, according to the invention of the fifth aspect, the sorting table which is created and updated by the primary first load balancing unit is distributed to the other first load balancing units. Therefore, there is an advantage that problems arising from update misses can be prevented, since all the load balancing units carry out first-sorting based on the same reference.

Furthermore, according to the invention of the sixth aspect, first-sorting is carried out based on a sorting table which reflects the results of measurements of the actual load in the server. Therefore, there is an advantage that the load can be balanced in accordance with the actual load.

Furthermore, according to the invention of the seventh aspect, first-sorting is carried out based on a sorting table which reflects the path load. Therefore, there is an advantage that the load balancing can be carried out as appropriate to the status of the communications path.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A load balancing system applied in a network system comprising a plurality of clients, and a plurality of servers which are separately provided in a plurality of sites and supply services to said plurality of clients, the load balancing system balancing service requests from said plurality of clients, and comprising:

a plurality of first load balancing units which are provided physically separate and balance load by primary-sorting service requests from said plurality of clients to said plurality of sites;

a plurality of second load balancing units which are provided in correspondence with said plurality of sites and each carry out load balancing by secondary-sorting a service request which has been primary-sorted by said first load balancing unit to one of a plurality of servers provided in said site;

one of said plurality of first load balancing units being set as a primary, the primary first load balancing unit monitoring the operating status of the other first load balancing units and said plurality of second load balancing units, and removing a unit which has stopped operating from the units which carry out load balancing.

2. The load balancing system according to claim 1, wherein said plurality of first load balancing units and said plurality of second load balancing units are physically dispersed across a wide region.

3. The load balancing system according to claim 1, wherein said primary first load balancing unit creates and updates a sorting table for considering and first-sorting the load in said plurality of servers, distributes the sorting table to the other first load balancing units when creating and updating said sorting table, and carries out first-sorting based on said sorting table.

4. The load balancing system according to claim 1, wherein one of the first load balancing units other than said primary first load balancing unit is set as a secondary; the operating statuses of said plurality of first load balancing units and said plurality of second load balancing units are mutually monitored, and in the case where said primary first load balancing unit has stopped operating according to the result of said mutual monitoring, said secondary first load balancing unit functions as a primary first load balancing unit.

5. The load balancing system according to claim 4, wherein said plurality of first load balancing units and said plurality of second load balancing units are physically dispersed across a wide region.

6. The load balancing system according to claim 4, wherein said primary first load balancing unit creates and updates a sorting table for considering and first-sorting the load in said plurality of servers, distributes the sorting table to the other first load balancing units when creating and updating said sorting table, and carries out first-sorting based on said sorting table.

7. The load balancing system according to claim 4, wherein in the case where said primary first load balancing unit which stopped operating has recommenced operation according to the result of said mutual monitoring, the primary first load balancing unit at that point functions as a secondary and the first load balancing unit which has recommenced operation functions as a primary.

8. The load balancing system according to claim 7, wherein said plurality of first load balancing units and said plurality of second load balancing units are physically dispersed across a wide region.

9. The load balancing system according to claim 7, wherein said primary first load balancing unit creates and updates a sorting table for considering and first-sorting the load in said plurality of servers, distributes the sorting table to the other first load balancing units when creating and updating said sorting table, and carries out first-sorting based on said sorting table.

10. The load balancing system according to claim 9, wherein said primary first load balancing unit creates and updates said sorting table based on measurements taken by said plurality of second load balancing units of the load in said plurality of servers.

11. The load balancing system according to claim 10, wherein said primary first load balancing unit creates and updates said sorting table based on measurements taken by said plurality of second load balancing units of the path load in the communications path to said plurality of clients.

* * * * *